(12) United States Patent
Adams et al.

(10) Patent No.: US 11,369,923 B2
(45) Date of Patent: Jun. 28, 2022

(54) WATER CONDITIONING SYSTEMS

(71) Applicant: Unger Marketing International, LLC, Bridgeport, CT (US)

(72) Inventors: Paul H. Adams, Monroe, CT (US); James M. Buckley, New Hartford, CT (US); Robert Camp, Bethany, CT (US); Kai Hirsch, Cologne (DE); Stephen Huda, Shelton, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 175 days.

(21) Appl. No.: 16/929,827

(22) Filed: Jul. 15, 2020

(65) Prior Publication Data

US 2020/0384413 A1   Dec. 10, 2020

Related U.S. Application Data

(62) Division of application No. 15/351,092, filed on Nov. 14, 2016, now Pat. No. 10,717,046.
(Continued)

(51) Int. Cl.
*B01D 61/02* (2006.01)
*B01D 61/08* (2006.01)
(Continued)

(52) U.S. Cl.
CPC ......... *B01D 61/025* (2013.01); *B01D 15/361* (2013.01); *B01D 35/1435* (2013.01);
(Continued)

(58) Field of Classification Search
CPC .............. B01D 15/361; B01D 2311/14; B01D 2311/2623; B01D 2311/2649;
(Continued)

(56) References Cited

U.S. PATENT DOCUMENTS 3,774,763 A   11/1973   Yall et al.
4,119,517 A   10/1978   Hengst
(Continued)

FOREIGN PATENT DOCUMENTS

CN   203486997 A1   3/2014
CN   204103914 A1   1/2015
(Continued)

OTHER PUBLICATIONS

Extended European Search Report for Application No. 16865222.0 dated Nov. 6, 2018; 9 pgs.
(Continued)

*Primary Examiner* — Dirk R Bass
(74) *Attorney, Agent, or Firm* — Cantor Colburn LLP

(57) ABSTRACT

A portable water conditioning system is provided that includes a water conditioner, a first sensor, a second sensor, and a controller. The water conditioner has a plurality of conditioning stages that condition water. The plurality of conditioning stages include, in a direction of flow of the water through the water conditioner, a reverse osmosis stage and a deionizing stage. The first sensor detects a first condition of the water before the reverse osmosis stage. The second sensor detects a second condition of the water after the reverse osmosis stage. The controller is in communication with the first and second sensors and determines a health status of the reverse osmosis stage based the first and second conditions. The first and second conditions each include a level of total dissolved solids of the water.

20 Claims, 17 Drawing Sheets

Related U.S. Application Data

(60) Provisional application No. 62/342,380, filed on May 27, 2016, provisional application No. 62/342,373, filed on May 27, 2016, provisional application No. 62/342,403, filed on May 27, 2016, provisional application No. 62/254,448, filed on Nov. 12, 2015.

(51) Int. Cl.
   *B01D 35/143*    (2006.01)
   *C02F 1/44*      (2006.01)
   *B01D 15/36*     (2006.01)
   *B01D 61/04*     (2006.01)
   *B01D 61/12*     (2006.01)
   *C02F 1/00*      (2006.01)
   *C02F 5/00*      (2006.01)
   *C02F 1/28*      (2006.01)
   *C02F 1/42*      (2006.01)

(52) U.S. Cl.
   CPC ........... *B01D 61/022* (2013.01); *B01D 61/04* (2013.01); *B01D 61/08* (2013.01); *B01D 61/12* (2013.01); *C02F 1/001* (2013.01); *C02F 1/008* (2013.01); *C02F 1/441* (2013.01); *C02F 5/00* (2013.01); *B01D 2201/301* (2013.01); *B01D 2201/347* (2013.01); *B01D 2201/4076* (2013.01); *B01D 2311/14* (2013.01); *B01D 2311/246* (2013.01); *B01D 2311/2623* (2013.01); *B01D 2311/2649* (2013.01); *B01D 2313/02* (2013.01); *B01D 2313/04* (2013.01); *B01D 2313/125* (2013.01); *B01D 2313/20* (2013.01); *B01D 2313/21* (2013.01); *B01D 2313/24* (2013.01); *B01D 2313/44* (2013.01); *B01D 2317/04* (2013.01); *C02F 1/283* (2013.01); *C02F 1/42* (2013.01); *C02F 2201/004* (2013.01); *C02F 2201/006* (2013.01); *C02F 2201/008* (2013.01); *C02F 2209/003* (2013.01); *C02F 2209/008* (2013.01); *C02F 2209/03* (2013.01); *C02F 2209/10* (2013.01); *C02F 2307/06* (2013.01); *Y02W 10/37* (2015.05)

(58) Field of Classification Search
   CPC ........... B01D 2313/02; B01D 2313/04; B01D 2313/125; B01D 2313/20; B01D 2313/21; B01D 2313/24; B01D 2313/44; B01D 2317/04; B01D 61/022; B01D 61/025; B01D 61/04; B01D 2201/301; B01D 2201/347; B01D 2311/246; B01D 35/1435; B01D 61/08; B01D 61/12; B01D 2201/4076; C02F 1/001; C02F 1/008; C02F 1/283; C02F 1/42; C02F 1/441; C02F 2201/004; C02F 2201/006; C02F 2201/008; C02F 2209/003; C02F 2209/008; C02F 2209/03; C02F 2209/10; C02F 2307/06; C02F 5/00; Y02W 10/37
   See application file for complete search history.

(56) References Cited

U.S. PATENT DOCUMENTS

| | | | |
|---|---|---|---|
| 4,230,579 A | 10/1980 | Bray | |
| 4,722,128 A | 2/1988 | Keller | |
| 4,801,375 A | 1/1989 | Padilla | |
| 4,836,923 A | 6/1989 | Popoff | |
| 4,967,960 A | 11/1990 | Futrell | |
| 4,988,427 A | 1/1991 | Wright | |
| 5,085,769 A | 2/1992 | Klausen et al. | |
| 5,399,260 A | 3/1995 | Eldredge et al. | |
| 5,503,735 A | 4/1996 | Vinas et al. | |
| 5,547,584 A | 8/1996 | Capehart | |
| 6,027,642 A | 2/2000 | Prince | |
| 6,228,255 B1 | 5/2001 | Peterson et al. | |
| 6,273,126 B1 | 8/2001 | Shen | |
| 6,372,132 B1 | 4/2002 | Williams | |
| 6,824,695 B2 | 11/2004 | Tempest, Jr. | |
| 7,100,427 B2 | 9/2006 | Kahn et al. | |
| 7,104,115 B2 | 9/2006 | Kahn et al. | |
| 7,237,682 B2 | 7/2007 | Reynolds et al. | |
| 7,249,000 B2 | 7/2007 | Kahn et al. | |
| 7,632,410 B2 | 12/2009 | Heiss | |
| 7,908,724 B2 | 3/2011 | Isabelle | |
| 7,955,503 B2 | 6/2011 | Onota et al. | |
| 8,469,331 B2 | 6/2013 | Burbank et al. | |
| 8,486,275 B2 | 7/2013 | Wolf | |
| 8,529,770 B2 | 9/2013 | Yencho | |
| 8,900,459 B2 | 12/2014 | Tenne | |
| 10,549,239 B2 | 2/2020 | Hirach et al. | |
| 10,717,046 B2 | 7/2020 | Adams et al. | |
| 2003/0024870 A1 | 2/2003 | Reinhart | |
| 2003/0127119 A1 | 7/2003 | Scordo | |
| 2003/0196947 A1 | 10/2003 | Gundrum et al. | |
| 2003/0230522 A1 | 12/2003 | Pavel | |
| 2005/0016906 A1 | 1/2005 | Gettman | |
| 2007/0045165 A1 | 3/2007 | Beall | |
| 2007/0009059 A1 | 4/2007 | Plummer et al. | |
| 2009/0008318 A1 | 1/2009 | Anes et al. | |
| 2009/0182263 A1 | 7/2009 | Burbank et al. | |
| 2009/0211605 A1 | 8/2009 | Ahmad | |
| 2010/0109601 A1 | 5/2010 | Coyle et al. | |
| 2010/0140095 A1 | 6/2010 | Telepciak et al. | |
| 2012/0284982 A1 | 11/2012 | Chen et al. | |
| 2013/0126430 A1 | 5/2013 | Kenley et al. | |
| 2014/0083846 A1 | 3/2014 | Moon et al. | |
| 2015/0336820 A1 | 11/2015 | Grabosch et al. | |
| 2017/0136412 A1 | 5/2017 | Huda | |
| 2017/0137303 A1 | 5/2017 | Hirsch et al. | |
| 2017/0137304 A1 | 5/2017 | Adams et al. | |
| 2020/0147549 A1 | 5/2020 | Hirsch et al. | |
| 2021/0047222 A1 | 2/2021 | Harrington et al. | |

FOREIGN PATENT DOCUMENTS

| | | | |
|---|---|---|---|
| EP | 0331136 A1 | 9/1989 | |
| EP | 0352779 A1 | 1/1990 | |
| WO | 02100780 A1 | 12/2002 | |
| WO | 2007018561 A1 | 2/2007 | |
| WO | 2008131546 A1 | 11/2008 | |
| WO | 2014110074 A1 | 7/2014 | |
| WO | 2015157680 A1 | 10/2015 | |

OTHER PUBLICATIONS

International Search Report and Written Opinion for International Application No. PCT/US16/61876 dated Jan. 24, 2017.
International Search Report and Written Opinion for International Application No. PCT/US16/61864 dated Mar. 9, 2017.
International Search Report and Written Opinion for International Application No. PCT/US16/61868 dated Mar. 14, 2017.
Supplementary European Search Report for Application No. 16865212.1 dated Nov. 9, 2018; 9 pgs.
Extended European Search Report for Application No. 16865216.2 dated Mar. 10, 2020; 8 pgs.

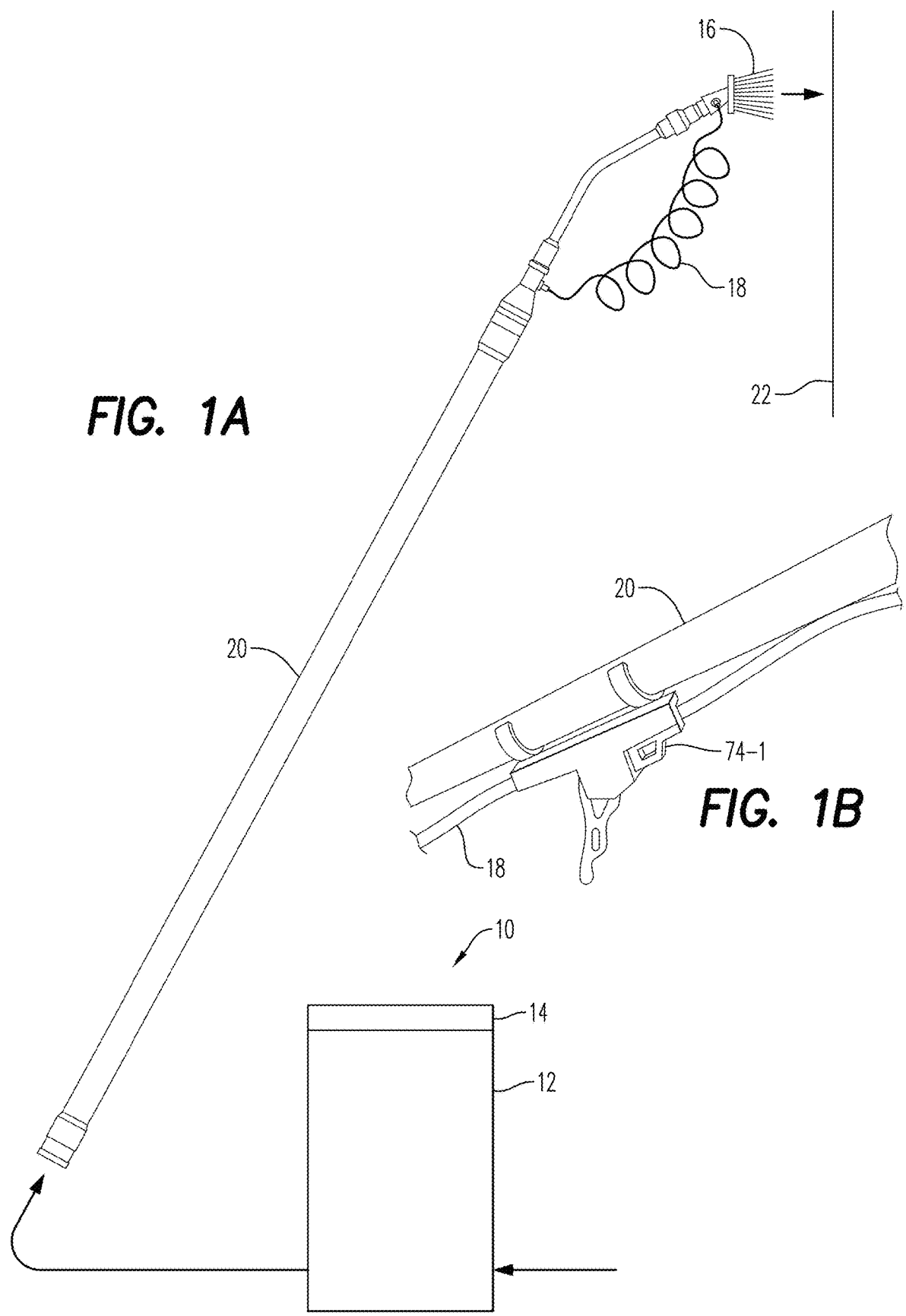

| PPM | 0.98 | 0.96 | 0.94 | 0.92 | 0.9 | 0.88 | 0.86 | 0.84 | 0.82 | 0.8 | 0.78 | 0.76 |
|---|---|---|---|---|---|---|---|---|---|---|---|---|
| | | | | | | % REJECTION | | | | | | |
| 200 | 3 | 5 | 7 | 9 | 11 | 14 | 16 | 18 | 20 | 22 | 24 | 27 |
| 400 | 5 | 9 | 14 | 18 | 22 | 27 | 31 | 35 | 40 | 44 | 48 | 53 |
| 800 | 9 | 18 | 27 | 35 | 44 | 53 | 61 | 70 | 79 | 87 | 96 | 105 |

| PPM | 0.98 | 0.96 | 0.94 | 0.92 | 0.9 | 0.88 | 0.86 | 0.84 | 0.82 | 0.8 | 0.78 | 0.76 |
|---|---|---|---|---|---|---|---|---|---|---|---|---|
| | | | | | | % REJECTION | | | | | | |
| 200 | $90.00 | $150 | $210 | $270 | $330 | $420.00 | $480 | $540 | $600 | $660 | $720 | $810 |
| 400 | $150 | $270 | $420 | $540 | $660 | $810.00 | $930 | $1,050 | $1,200 | $1,320 | $1,440 | $1,590 |
| 800 | $270 | $540 | $810 | $1,050 | $1,320 | $1,590.00 | $1,830 | $2,100 | $2,370 | $2,610 | $2,880 | $3,150 |

*FIG. 12*

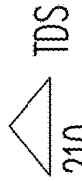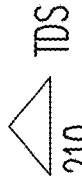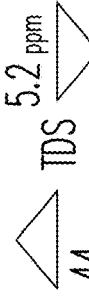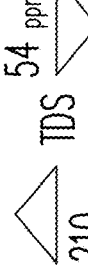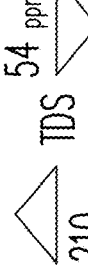
FIG. 13

FIG. 14
DISPLAY EXAMPLES:
INSTRUCTIONS
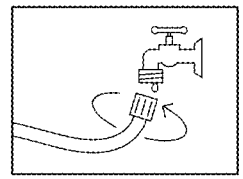 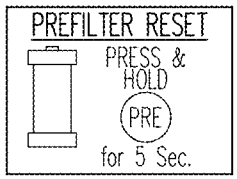 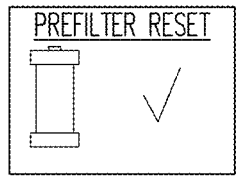
SCREENS CYCLING (TIME LEFT/INSTRUCTIONS)
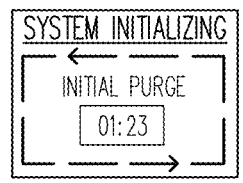 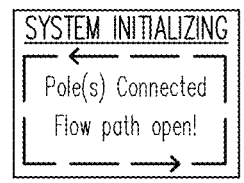
CHANGE IN STATE (YELLOW TO RED) RO
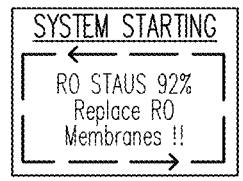
SCREENS CYCLING (MOTION PROVIDING INSTRUCTION TO START MACHINE)
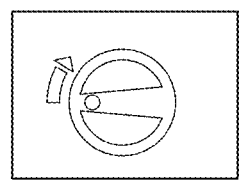 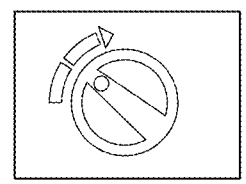 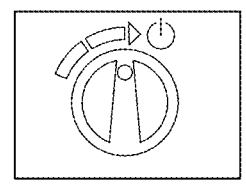
STATUS OF EQUIPMENT AT START-UP
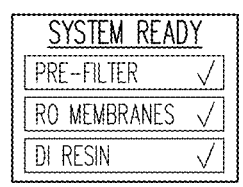
WARNINGS
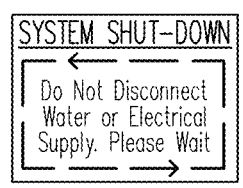 

WATER CONDITIONING SYSTEMS

CROSS REFERENCE TO RELATED APPLICATIONS

This application is a Divisional Application of Non-Provisional application Ser. No. 15/351,092 filed Nov. 14, 2016, which claims the benefit of U.S. Provisional Application No. 62/254,448 filed on Nov. 12, 2015, claims the benefit of U.S. Provisional Application No. 62/342,403 filed on May 27, 2016, claims the benefit of U.S. Provisional Application No. 62/342,373 filed on May 27, 2016, and claims the benefit of U.S. Provisional Application No. 62/342,380 filed on May 27, 2016, the entire contents of which are incorporated by reference herein.

BACKGROUND

The present disclosure is related to water conditioning systems. More particularly, the present disclosure is related to portable water conditioning systems having water quality feedback and monitoring controls.

BRIEF DESCRIPTION

Water conditioners that condition incoming tap water for use in one or more cleaning tasks are known. As used herein, the term "conditioned water" shall mean water that has been filtered, (distilled), deionized, demineralized (e.g., via reverse osmosis), softened, anti-scaled, exposed to any other water treatment process—including the addition of one or more additives or components, and any combinations thereof.

However, it has been determined by the present disclosure that there is a need for water conditioning systems that provide feedback to the operator regarding the water quality especially with portable water conditioning systems. Moreover, it has been determined by the present disclosure that controllers that provide such water quality feedback can be used to optimize the utilization of the conditioning media in the system.

Accordingly, the present disclosure provides for water conditioning systems that provide enhanced utility and ease of use as compared to prior art water conditioners. The water conditioning systems of the present disclosure advantageously provide information to the user that can include, for example, information related to when to change one or more of the filter media to minimize the cost of operation.

SUMMARY

A portable water conditioning system is provided that includes water quality feedback and monitoring controls.

A portable water conditioning system is provided that includes a water conditioner, a first sensor, a second sensor, and a controller. The water conditioner has a plurality of conditioning stages that condition water. The plurality of conditioning stages include, in a direction of flow of the water through the water conditioner, a reverse osmosis stage and a deionizing stage. The first sensor detects a first condition of the water before the reverse osmosis stage. The second sensor detects a second condition of the water after the reverse osmosis stage. The controller is in communication with the first and second sensors and determines a health status of the reverse osmosis stage based the first and second conditions. The first and second conditions each include a level of total dissolved solids of the water.

In some embodiments either alone or in combination with one or more of the afore and/or aft mentioned embodiments, the system can further include a backpressure regulator that maintains a system pressure at a predetermined level.

In some embodiments either alone or in combination with one or more of the afore and/or aft mentioned embodiments, the backpressure regulator is in communication with the controller, the controller controlling the backpressure regulator to maintain a system pressure at the predetermined level.

In some embodiments either alone or in combination with one or more of the afore and/or aft mentioned embodiments, the controller controls the water conditioner to adjust a flow path of the water through the reverse osmosis stage based on the first and second conditions.

In some embodiments either alone or in combination with one or more of the afore and/or aft mentioned embodiments, the system can further include a third sensor in communication with the controller, the third sensor detecting a third condition of the water after the deionizing stage, wherein the third condition of the water includes a level of total dissolved solids.

In some embodiments either alone or in combination with one or more of the afore and/or aft mentioned embodiments, the controller controls the water conditioner to adjust a flow path of the water through the reverse osmosis and deionizing stages, based on the first, second, and third conditions, to provide conditioned water having a desired condition.

In some embodiments either alone or in combination with one or more of the afore and/or aft mentioned embodiments, the controller determines a health status of the deionization stage based the second and third conditions.

In some embodiments either alone or in combination with one or more of the afore and/or aft mentioned embodiments, the plurality of conditioning stages can further include a pre-filter stage prior to, in the direction of flow of the water through the water conditioner, the reverse osmosis stage.

In some embodiments either alone or in combination with one or more of the afore and/or aft mentioned embodiments, the pre-filter stage is a particle filter and/or a chlorine filter.

In some embodiments either alone or in combination with one or more of the afore and/or aft mentioned embodiments, the system can further include a fourth sensor in communication with the controller, the fourth sensor detecting a flow rate of the water after the pre-filter stage.

In some embodiments either alone or in combination with one or more of the afore and/or aft mentioned embodiments, the controller determines, based at least on the flow rate, a health status of the pre-filter stage.

In some embodiments either alone or in combination with one or more of the afore and/or aft mentioned embodiments, the system can further include a pump in electrical communication with the controller, the pump boosting pressure of the water flowing through the water conditioner.

In some embodiments either alone or in combination with one or more of the afore and/or aft mentioned embodiments, the controller prevents activation the pump based on the flow rate.

In some embodiments either alone or in combination with one or more of the afore and/or aft mentioned embodiments, the system can further include a pump in electrical communication with the controller, the pump boosting pressure of the water flowing through the water conditioner.

In some embodiments either alone or in combination with one or more of the afore and/or aft mentioned embodiments, the reverse osmosis stage includes more than one reverse osmosis stage that are arranged in the flow of water parallel with respect to one another.

In some embodiments either alone or in combination with one or more of the afore and/or aft mentioned embodiments, the reverse osmosis stage is a reverse osmosis membrane.

In some embodiments either alone or in combination with one or more of the afore and/or aft mentioned embodiments, the deionizing stage is deionization resin.

In some embodiments either alone or in combination with one or more of the afore and/or aft mentioned embodiments, the system can further include a heat exchanger in communication with the controller, the controller controlling the heat exchanger to heat and/or cool the water going into and/or out of the water conditioner.

In some embodiments either alone or in combination with one or more of the afore and/or aft mentioned embodiments, the system can further include a chemical dispenser in electrical communication with the controller, the controller controlling the chemical dispenser to dispense a chemical into the water going into and/or out of the water conditioner.

In some embodiments either alone or in combination with one or more of the afore and/or aft mentioned embodiments, the chemical dispenser dispenses the chemical into the water by a process selected from the group consisting of injection into the water, drawing into the water, mixing into the water, and dissolving into the water.

In some embodiments either alone or in combination with one or more of the afore and/or aft mentioned embodiments, the chemical is selected from the group consisting of soap, cleaning chemical, rinsant, wax, colorant, a surface modifying additive, odorant, and any combinations thereof.

In some embodiments either alone or in combination with one or more of the afore and/or aft mentioned embodiments, the controller recirculates a portion of the water exiting the reverse osmosis stage.

In some embodiments either alone or in combination with one or more of the afore and/or aft mentioned embodiments, the system can further include a frame having the water conditioner and controller secured thereto, the frame having wheels connected to or connectable thereto.

In some embodiments either alone or in combination with one or more of the afore and/or aft mentioned embodiments, the controller communicates a status of one or more portions of the water conditioner by a method selected from the group consisting of a visual communication on the controller, an audible communication from the controller, a text message, an email, and any combinations thereof.

In some embodiments either alone or in combination with one or more of the afore and/or aft mentioned embodiments, the controller wired or wirelessly communicates with one or more external devices.

In some embodiments either alone or in combination with one or more of the afore and/or aft mentioned embodiments, the controller determines and stores in memory an assumed incoming water quality.

In some embodiments either alone or in combination with one or more of the afore and/or aft mentioned embodiments, the controller has an assumed incoming water quality based on an average of a plurality of prior total dissolved solids measurements and/or a known water quality at a location of the controller.

In some embodiments either alone or in combination with one or more of the afore and/or aft mentioned embodiments, the location of the controller is input into the controller or based on a GPS location detected by the controller.

In some embodiments either alone or in combination with one or more of the afore and/or aft mentioned embodiments, the controller is configured, based on the assumed incoming water quality and the health status of the reverse osmosis stage, to determine whether or not to change a membrane of the reverse osmosis stage.

A portable water conditioning system is provided that includes a water conditioner, a first sensor, a second sensor, a third sensor, and a controller. The water conditioner has a plurality of conditioning stages that condition water. The plurality of conditioning stages include, in a direction of flow of the water through the water conditioner, a reverse osmosis stage and a deionizing stage. The first sensor detects a first condition of the water before the reverse osmosis stage. The second sensor detects a second condition of the water after the reverse osmosis stage. The third sensor detects a third condition of the water after the deionization stage. The controller is in communication with the first, second, and third sensors and controls the water conditioner to adjust a flow path of the water through the reverse osmosis and deionizing stages, based on the first, second, and third conditions, to provide conditioned water having a desired condition.

In some embodiments either alone or in combination with one or more of the afore and/or aft mentioned embodiments, the controller determines a health status of the reverse osmosis stage based the first and second conditions, wherein the first and second conditions each include a temperature and a level of total dissolved solids of the water.

In some embodiments either alone or in combination with one or more of the afore and/or aft mentioned embodiments, the controller controls the water conditioner to adjust the flow path through the reverse osmosis stage based on the first and second conditions.

In some embodiments either alone or in combination with one or more of the afore and/or aft mentioned embodiments, the third condition of the water includes a level of total dissolved solids.

In some embodiments either alone or in combination with one or more of the afore and/or aft mentioned embodiments, the controller determines a health status of the deionization stage based the second and third conditions.

In some embodiments either alone or in combination with one or more of the afore and/or aft mentioned embodiments, the plurality of conditioning stages further includes a pre-filter stage prior to, in the direction of flow of the water through the water conditioner, the reverse osmosis stage.

In some embodiments either alone or in combination with one or more of the afore and/or aft mentioned embodiments, the pre-filter stage is a particle filter and/or a chlorine filter.

In some embodiments either alone or in combination with one or more of the afore and/or aft mentioned embodiments, the system can further include a fourth sensor in communication with the controller, the fourth sensor detecting a flow rate of the water after the pre-filter stage.

In some embodiments either alone or in combination with one or more of the afore and/or aft mentioned embodiments, the controller determines, based at least on the flow rate, a health status of the pre-filter stage.

In some embodiments either alone or in combination with one or more of the afore and/or aft mentioned embodiments, the system can further include a pump in electrical communication with the controller, the pump boosting pressure of the water flowing through the water conditioner.

In some embodiments either alone or in combination with one or more of the afore and/or aft mentioned embodiments, the controller prevents activation the pump based on the flow rate.

In some embodiments either alone or in combination with one or more of the afore and/or aft mentioned embodiments, the reverse osmosis stage includes more than one reverse osmosis stage that are arranged in the flow of water parallel with respect to one another.

In some embodiments either alone or in combination with one or more of the afore and/or aft mentioned embodiments, the system can further include a heat exchanger in communication with the controller, the controller controlling the heat exchanger to heat and/or cool the water going into and/or out of the water conditioner.

In some embodiments either alone or in combination with one or more of the afore and/or aft mentioned embodiments, the system can further include a chemical dispenser in electrical communication with the controller, the controller controlling the chemical dispenser to dispense a chemical into the water going into and/or out of the water conditioner.

In some embodiments either alone or in combination with one or more of the afore and/or aft mentioned embodiments, the controller recirculating a portion of the water exiting the reverse osmosis stage.

In some embodiments either alone or in combination with one or more of the afore and/or aft mentioned embodiments, the system can further include a frame having the water conditioner and controller secured thereto, the frame having wheels connected to or connectable thereto.

In some embodiments either alone or in combination with one or more of the afore and/or aft mentioned embodiments, the controller determines and stores in memory an assumed incoming water quality.

In some embodiments either alone or in combination with one or more of the afore and/or aft mentioned embodiments, the assumed incoming water quality is based on an average of a plurality of prior total dissolved solids measurements and/or a known water quality at a location of the controller.

In some embodiments either alone or in combination with one or more of the afore and/or aft mentioned embodiments, the location of the controller is input into the controller or based on a GPS location detected by the controller.

In some embodiments either alone or in combination with one or more of the afore and/or aft mentioned embodiments, the controller, based on the assumed incoming water quality and the health status of the reverse osmosis stage, determines whether or not to change a membrane of the reverse osmosis stage.

The above-described and other features and advantages of the present disclosure will be appreciated and understood by those skilled in the art from the following detailed description, drawings, and appended claims.

DESCRIPTION OF THE DRAWINGS

The patent or application file contains at least one photograph executed in color. Copies of this patent or patent application publication with color drawing(s) will be provided by the Office upon request and payment of the necessary fee.

FIG. 1A is a schematic depiction of an exemplary embodiment of a portable water conditioning system according to the present disclosure in use with a water fed cleaning brush on an extension pole;

FIG. 1B illustrates an exemplary embodiment of a pole mounted flow control valve;

FIG. 12 is a table illustrating replacement of DI cartridges based on the percent rejection across RO filters at different incoming water qualities;

FIG. 13 illustrates various status communications output by the system on the display regarding the health or operational status of the system and filters; and FIG. 14 illustrates other various communications output by the system on the display regarding the health or operational status of the system and filters.

DETAILED DESCRIPTION

Figure 2A:
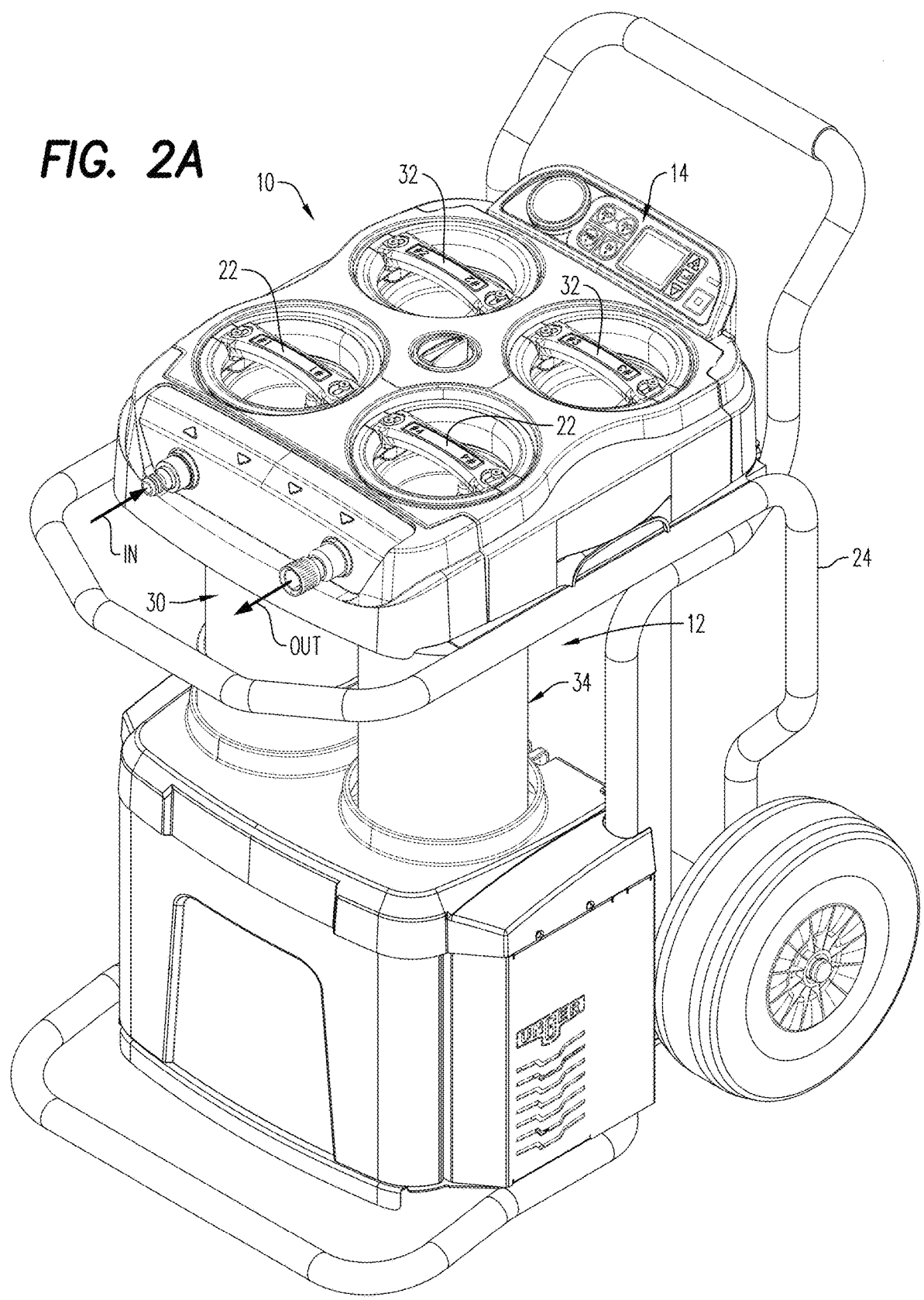
FIG. 2A is a top, partial perspective view of a first exemplary embodiment of a water conditioner according to the present disclosure.

Referring to the drawings and in particular to FIG. 1A, an exemplary embodiment of a water conditioning system according to the present disclosure is shown and is referred to as reference numeral 10. System 10 includes a water conditioner 12 in communication with a controller 14. Advantageously, controller 14 is configured to provide the operator with information regarding the performance of conditioner 12, allowing the operator to operate system 10 in a manner that maximizes or optimizes the utilization of the filter media in conditioner 12 and/or reduce operational costs.

Conditioner 12 is shown by way of example in fluid communication with a water-fed cleaning brush 16 via one or more tubes 18 and is secured to an extension pole 20 so that the conditioned water can clean a desired surface 22. Of course, it is contemplated by the present disclosure for conditioner 12 to find any other use for the conditioned fluid.

In some embodiments, system 10 is light weight and compact in size such that it can easily be transported in vans, cars, pick-up trucks, and the like. In addition, system 10 is preferably provided on a cart for mobility around a work site. Of course, other uses of system 10 are contemplated by the present disclosure.

As discussed above, "conditioned water" means water that has been filtered, deionized, demineralized, softened, exposed any other water treatment process—including the addition of one or more additives or components, and any combinations thereof. Accordingly, conditioner 12 can include any filter media sufficient to provide the conditioned water. For example, conditioner 12 can include filter media such as, but not limited to, a particle filter, a chlorine filter (i.e., activated carbon), an ion remover (e.g., deionization resin and/or reverse osmosis membrane), a UV sterilizer, and any combinations thereof. When disclosing "particle filtration", it is contemplated by the present disclosure for conditioner 12 to be sufficient for any desired filtration level such as, but not limited to, nano-filtration, ultra-filtration, micro-filtration, and others.

Regarding the addition of one or more additives or chemicals, it is contemplated by the present disclosure for conditioner 12 to add the additives or chemicals via injection into the flow stream, drawing into the flow stream, mixing or dissolving into the flow stream, and any other additive method. Moreover, it is contemplated for system 10 to add the additives before or after conditioner 12. It is contemplated for the additives to be added automatically or selectively by the user—with the selective addition being possible via the display or remote as described herein below. Further and disclosed herein below, it is contemplated by the present disclosure for conditioner 12 to heat, cool, or otherwise modify or treat the water.

By of example, system 10 and/or conditioner 12 can be configured to condition the water by adding, before or after the conditioner, an additive such as, but not limited to, a general purpose cleaning agent, muric acid, a sealer agent, a protectant, bleach, vinegar, an anti-mold agent, an anti-bacterial agent, a nanotechnology agent, combinations of the foregoing, and others.

By way of example, conditioner 12 can be a pure water system as shown and described in Applicant's own U.S. application Ser. No. 14/684,071 filed on Apr. 10, 2015, the contents of which are incorporated in their entirety herein. Conditioner 12 can also include the system as shown and described in Applicant's own U.S. Application Ser. No. 62/160,832 filed on May 13, 2015, the contents of which are incorporated in their entirety herein.

Figure 2B:
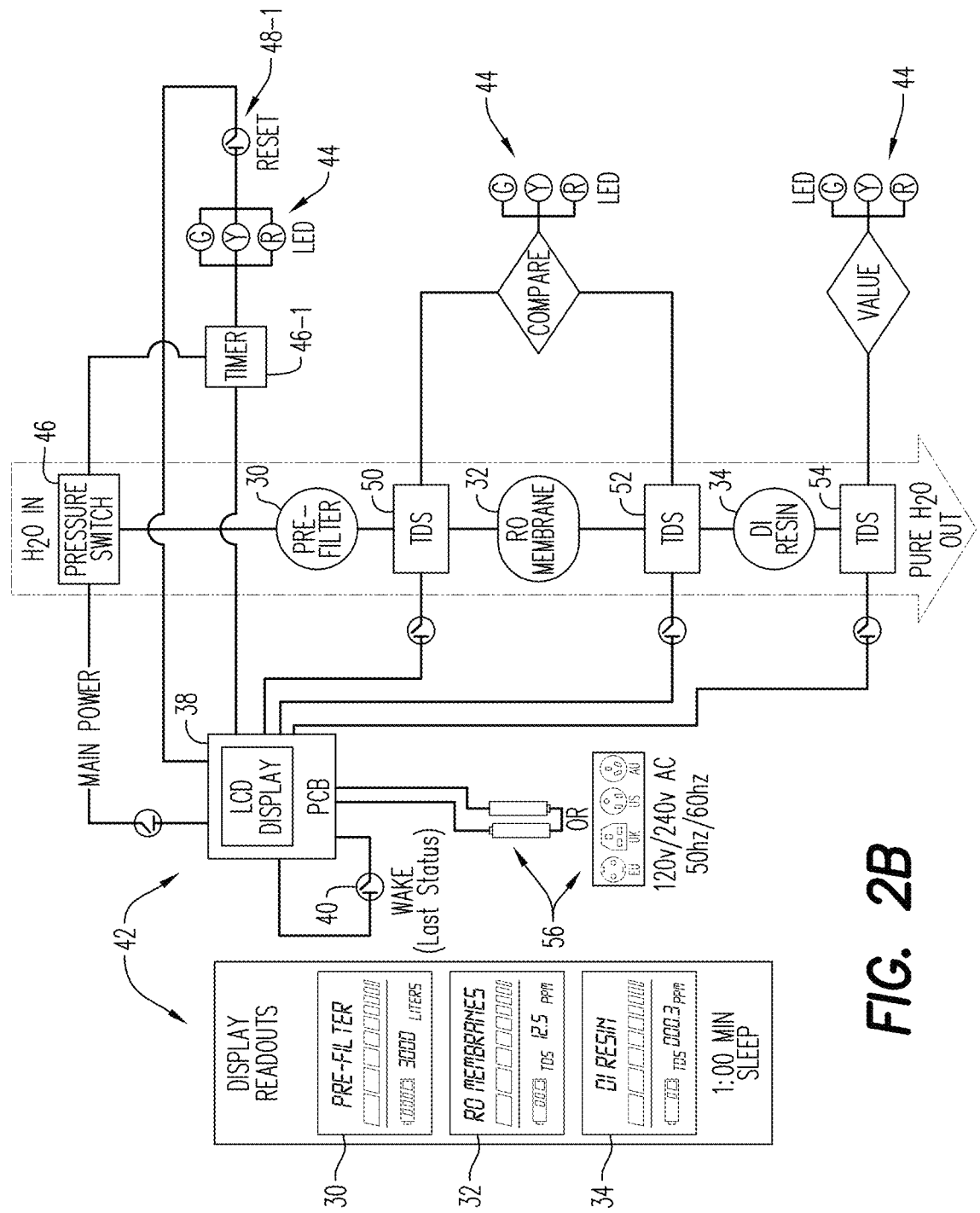
FIG. 2B illustrates an exemplary embodiment of a controller for use with the water conditioner of FIG. 2A.

Referring now to FIGS. 2a and 2b, an exemplary embodiment of conditioner 12 is shown. Conditioner 12 includes a frame 24 retaining a plurality of conditioning stages 28. Frame 24 can, in some embodiments, be configured for mobile uses and, thus, can include wheels connected to or connectable to the frame. Moreover, it is contemplated by the present disclosure for frame 24 to be configured for movement by devices, such as, but not limited to carts, hand trucks, dollies, and the like.

In the illustrated embodiment, stages 28 include a pre-filter stage 30, at least one reverse osmosis (RO) stage 32 (two shown), and a deionizing (DI) stage 34. When conditioner 12 includes more than one RO stage 32, it is contemplated by the present disclosure for the RO stages to be aligned serially with respect to one another or parallel with respect to one another—with respect to the flow. The embodiment illustrated in FIGS. 2a and 2b includes, in a direction of flow through conditioner 12, pre-filter stage 30, two parallel RO stages 32, and DI stage 34. Of course, other positions and combinations stages 30, 32, 34 are contemplated by the present disclosure.

Stages 28 are illustrated by way of example only as being secured together in a unitary system. Of course, it is contemplated by the present disclosure for stages 28 to be separate from, but in fluid communication with one another and electrically communicating with controller 14.

Conditioner 12 is controlled and monitored by controller 14, as described in more detail below, to selectively pass incoming water through one or more of stages 30, 32, 34 to provide conditioned water of desired quality.

Additionally, it should be recognized that conditioner 12 is described herein by way of example only. Of course, it is contemplated by the present disclosure for conditioner 12 to include any number of different water conditioning stages 28 that are fluidly connectable to one another in series, in parallel, and any combinations thereof.

Figure 3A:
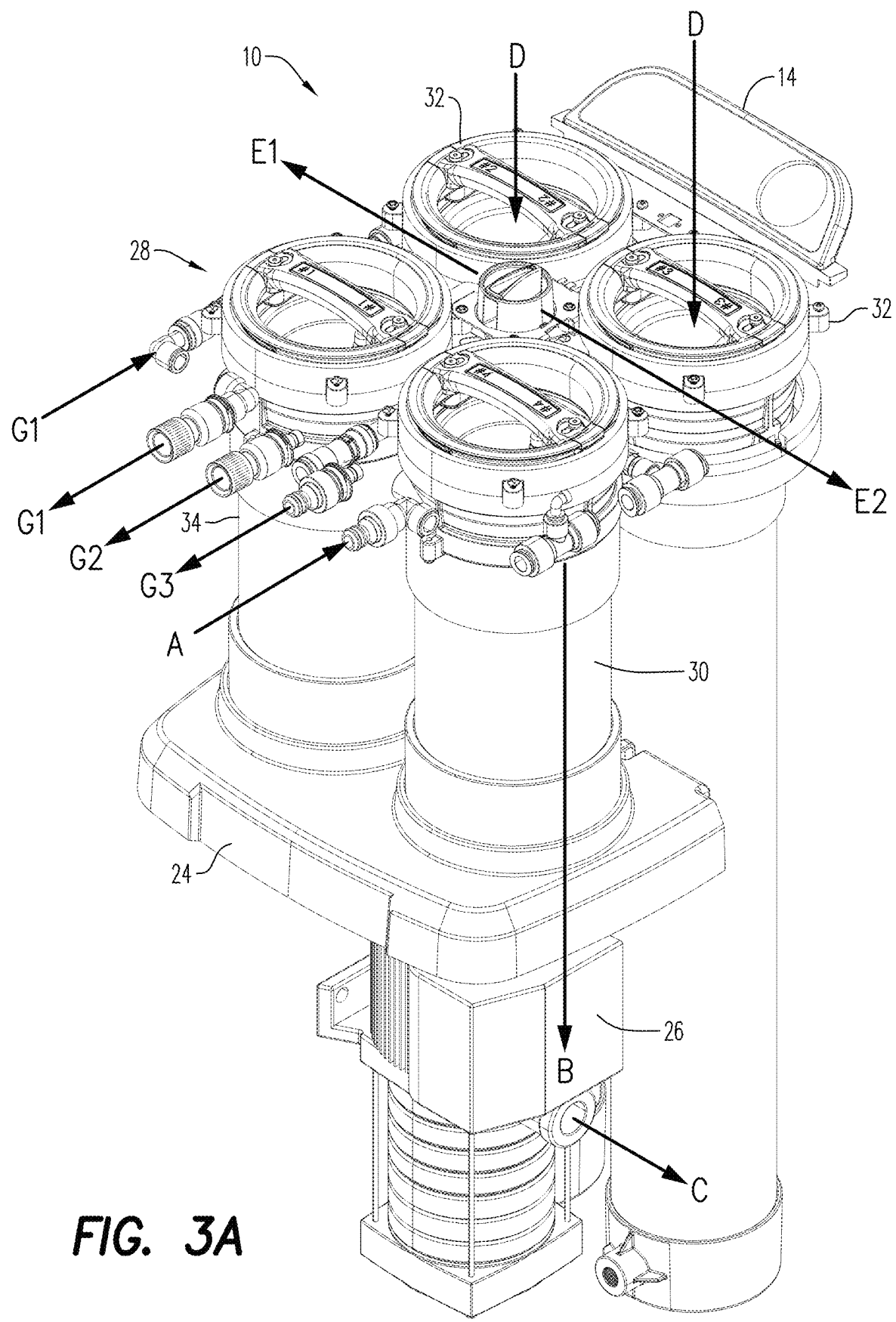
FIG. 3A is a top, partial perspective view of a second exemplary embodiment of a water conditioner according to the present disclosure.
Figure 3B:
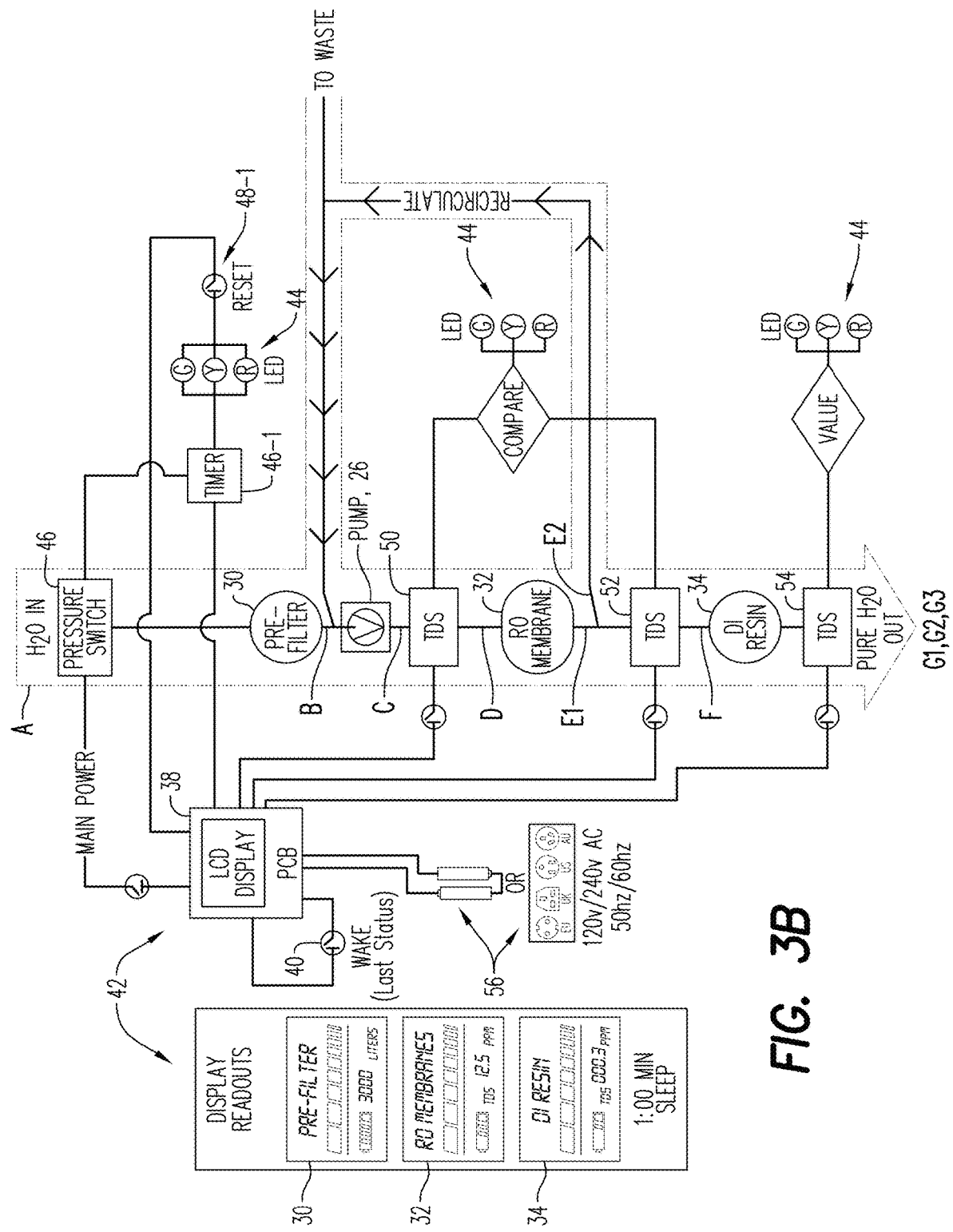
FIG. 3B illustrates an exemplary embodiment of a controller for use with the water conditioner of FIG. 3A.
Figure 4:
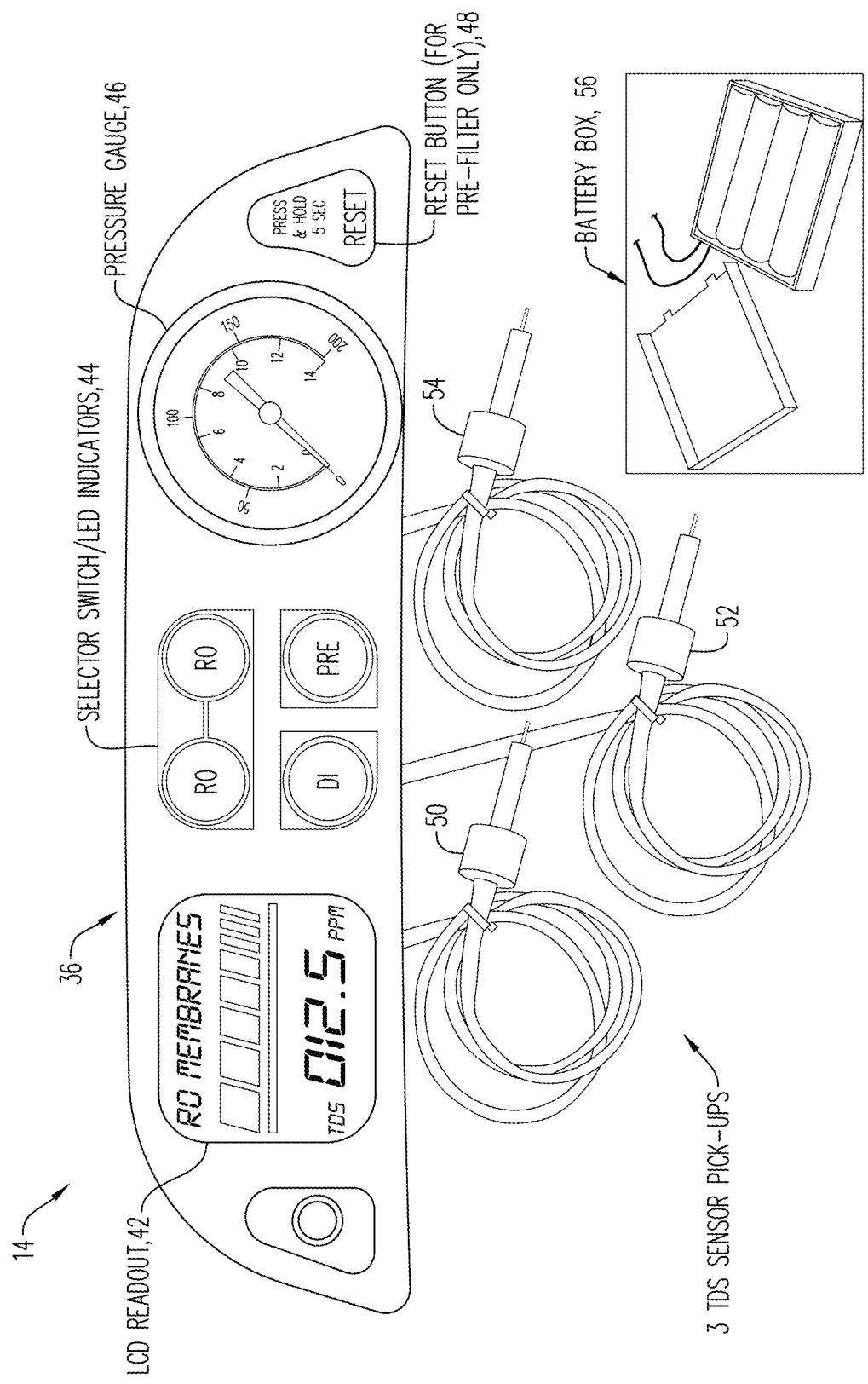
FIG. 4 illustrates certain operational attributes of an exemplary embodiment of a controller according to the present disclosure.

Referring now to FIGS. 3a and 3b, another exemplary embodiment of conditioner 12 is shown. Here, conditioner 12 is substantially similar to that shown in FIGS. 2a and 2b, but further includes a motorized pump 26 on frame 24. Pump 26 can be configured to boost pressure of water flowing within condition 12. Additionally, pump 26 can be configured to recirculate a portion of the water exiting RO stages 32 as described herein below. Pump 26 can be any desired pumping device including, but not limited to, AC pumping devices, DC pumping devices, and any combinations thereof. Of course, it is also contemplated by the present disclosure for conditioner 12 to find use with no pump 32, but rather to be fed with water at normal line or tap pressure.

When present, pump 26 can be powered by power source 56 that can include a battery source and/or a line source as shown in FIGS. 2b and 3b. Source 56 can be a utility source and/or a gas engine and/or a generator or others.

The embodiment illustrated in FIGS. 3a and 3b includes, in a direction of flow through conditioner 12, pre-filter stage 30, two RO stages 32, and DI stage 34.

Incoming tap water enters conditioner 12 at flow A. Controller 14 can control conditioner 12 to allow flow A to enter pre-filter stage 30 or bypass the pre-filter stage as needed. Water exiting or bypassing pre-filter stage 30 enters pump 26 at flow B and exits the pump at flow C.

Controller 14 can control conditioner 12 to allow water exiting pump 26 at flow C to enter RO stages 32 at flow D, to bypass the RO stages and enter DI stage 34 at flow F, or to bypass both the RO and DI stages and exit the conditioner at one or more output flows G1, G2, G3 (three shown)—where each of the outflow flows is selectively connectable to a different water-fed cleaning brush 16 or any other cleaning device.

When controller 14 controls conditioner 12 to allow water exiting pump 26 at flow C to enter RO stages 32 at flow D, the conditioner preferably includes a manifold or other flow divider (not shown) that divides flow C into two flow D's as show. RO stages 32 are, as known in the art, configured to separate incoming flow D into a permeate flow E1 and a concentrate flow E2.

Controller 14 controls conditioner 12 to allow the permeate flow E1 to either enter DI stage 34 at flow F, or bypass the DI stage and exit the conditioner at conditioner at one or more output flows G1, G2, G3 (three shown). It should be recognized that conditioner 12 is illustrated having one permeate flow E1 and one permeate flow E2. Of course, each RO stage 32 in conditioner 12 outputs both flows E1, E2. Conditioner 12 can be configured to allow the flows E1, E2 to be handled separately and/or to allow the two permeate flows E1 to be recombined via a manifold (not shown) and/or to allow the two concentrate flows E2 to be recombined via another manifold (not shown).

Controller 14 controls conditioner 12 to allow the concentrate flow E2 to either exit the conditioner to waste and/or to recirculate into the flow before pump 26—namely into flow B.

It should be recognized that pump 26 is illustrated by way of example as being present in conditioner 12 before RO stages 32. Of course, it is contemplated by the present disclosure for pump 26 to be located after RO stages 32 or both before and after the RO stages.

It is further contemplated for controller 14 to detect one or more operational attributes of the motor and/or pump 26 such as, but not limited to, current, voltage, temperature, speed, flow rate, pressure, and others—and adjust the operation of conditioner 12 based on these attributes. For example, controller 14 can opening and/or close one or more valves (not shown) to control the flow through system 10, as well as provide different levels of flow, pressure, temperature, and the like.

The operation of controller 14 will be described in more detail with simultaneous reference to FIGS. 2b, 3b, and 4-8.

Controller 14 includes a panel region 36 and a processor and/or circuit board 38 having one or more displays, gauges, buttons, switches, or other common control elements. In the illustrated, controller 14 includes one or more of a power button 40, a display 42, a plurality of stage switches and/or indicators 44 ("switches"), a pressure gauge 46, and a reset button 48. Controller 14 also includes one or more sensors 50, 50-1, 52, 54 and a power source 56.

Power button 40 can operatively connect controller 14 to power source 56. Power source 56 can be a battery source and/or a line source as shown in FIGS. 2b and 3b. In some embodiments, the battery source can be a rechargeable battery that is recharged by the line source, by a solar panel on the system or others.

Figure 5:
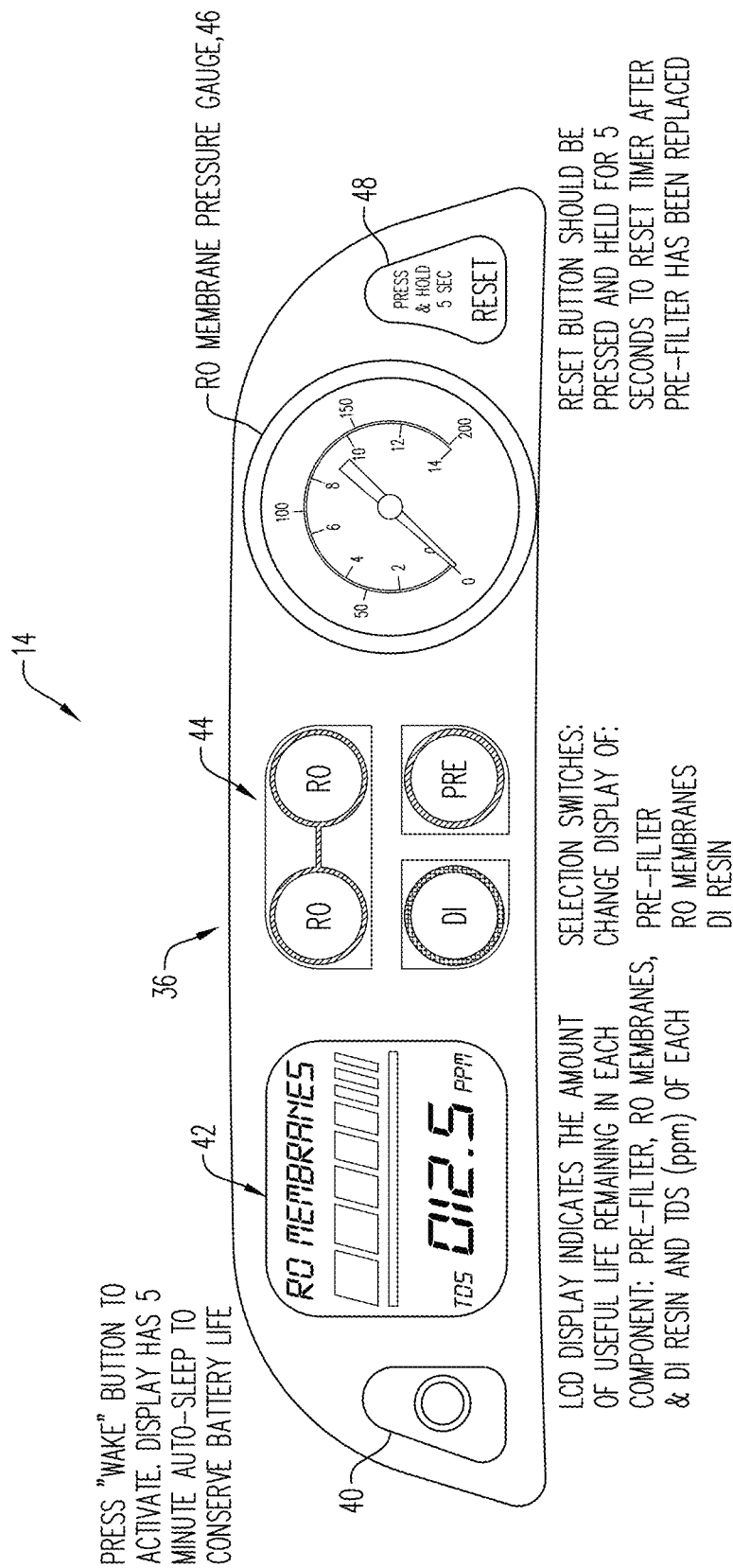
FIG. 5 illustrates the controller of FIG. 4 in a power up mode.
Figure 6:
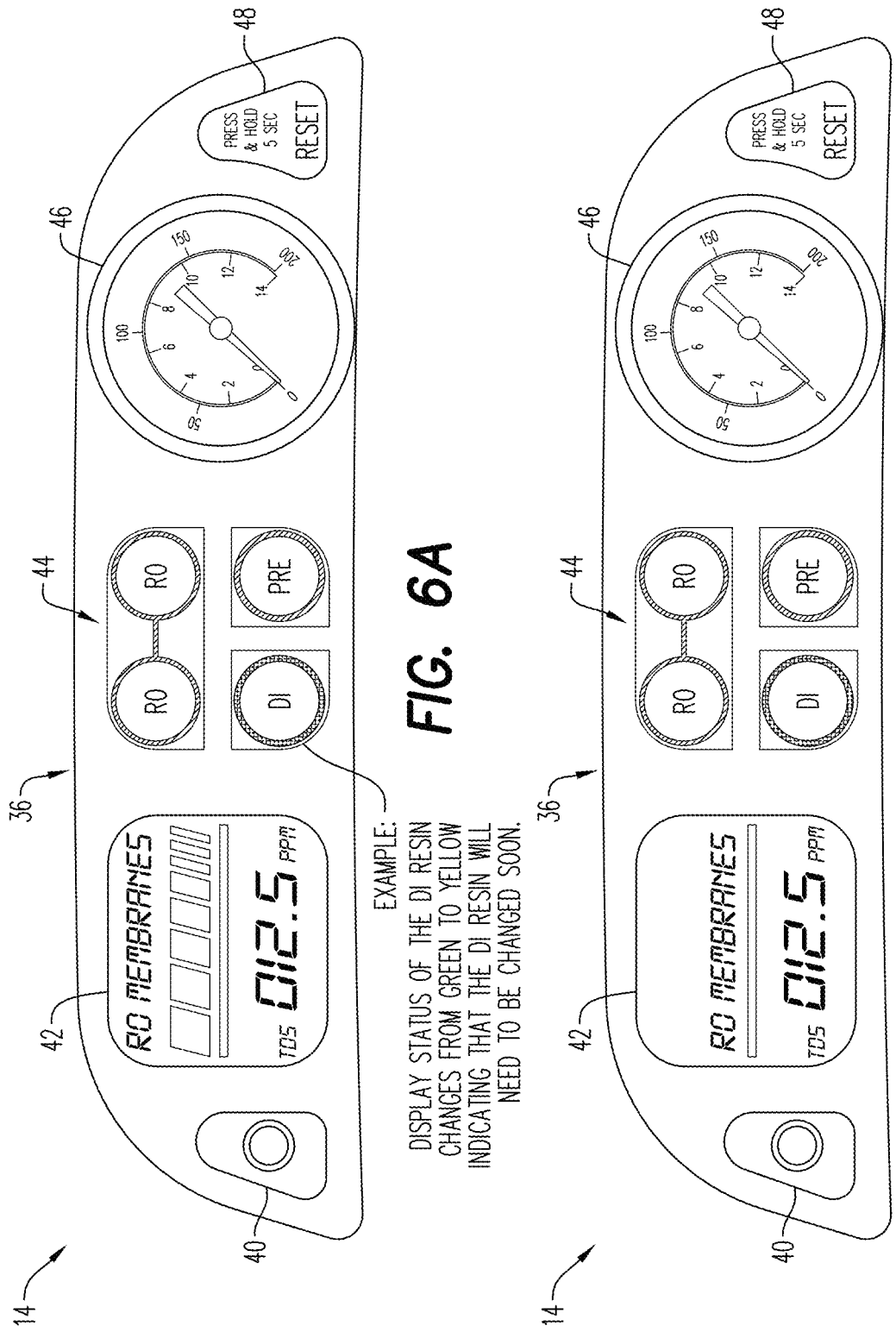
FIG. 6A illustrates the controller of FIG. 4 in an attention mode.
FIG. 6B illustrates the controller of FIG. 4 in an alternate attention mode.
Figure 10:
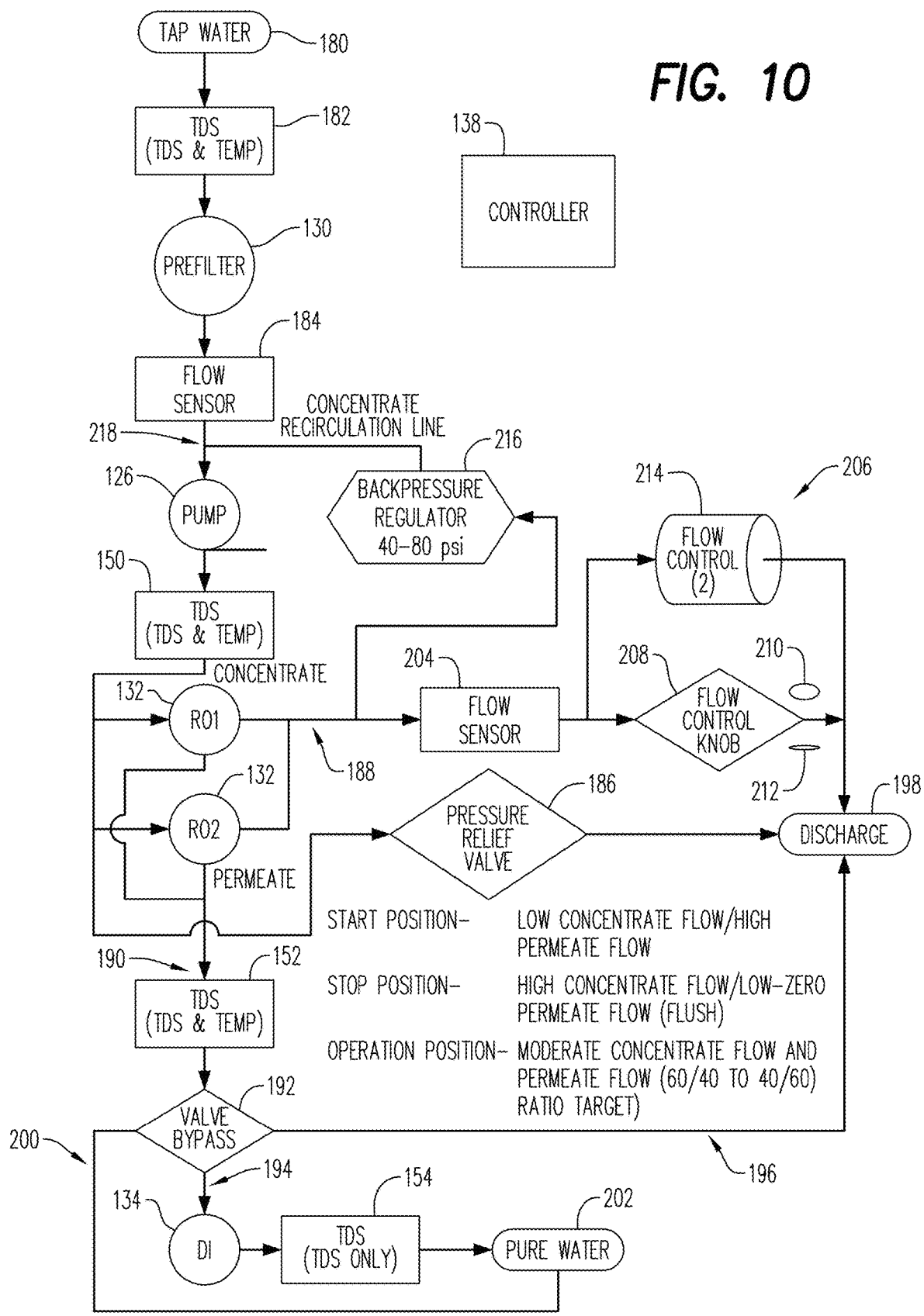
FIG. 10 is a process and instrument diagram (PNID) of an exemplary embodiment of a water conditioning system according to the present disclosure.

Controller 14 can be configured, in some embodiments and as shown in FIG. 5, so that power button 40 operates—at least in part—as a "wake mode" button. Alternately and as shown in FIG. 10 and discussed in detail below, controller 138 can be turned on and off using flow diversion control 206.

In the embodiment of FIG. 5, controller 14 can be configured to selectively turn on or off elements such as, but not limited to, pump 26, display 42, and switches 44 after a selected period of time so as to preserve power from power source 56, while continuing to control system 10 as needed.

Display 42 can be any display technology such as, but not limited to LCD, LED, digital, touch, but is preferably an LCD display that provides the operator with information regarding the operation of system 10. For example, and as seen in FIGS. 2b and 3b, display 42 can indicate a "status" or "condition" of stages 30, 32, and 34. Also and as seen in FIGS. 6a and 6b, display 42 can take on any desired shape or size depending on the information to be displayed.

Figure 7:
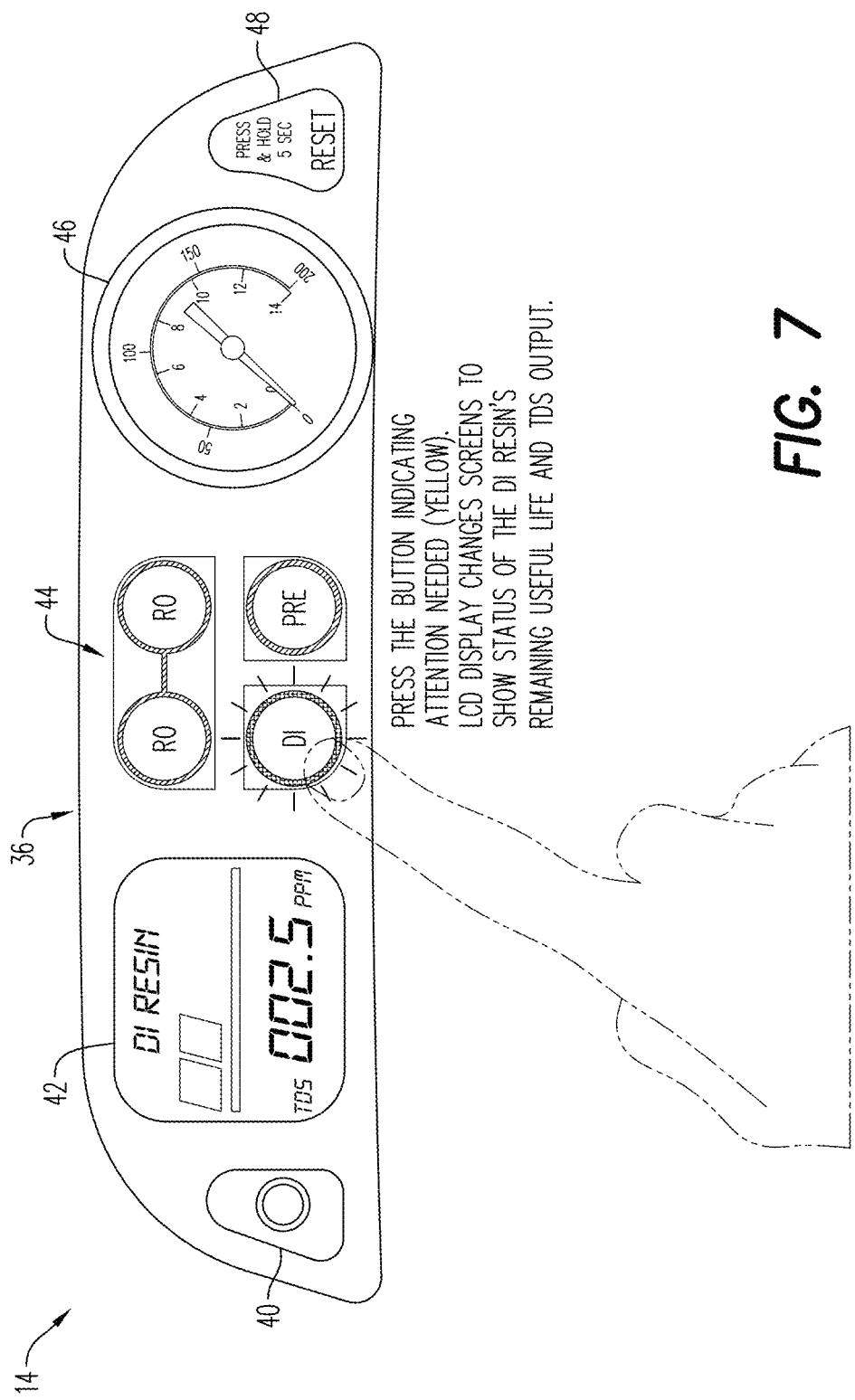
FIG. 7 illustrates the controller of FIG. 4 in a check status mode.

Controller 14 is configured to rotate or change the information displayed on display 42 by way of switches 44. Thus, the operator can activate any one of switches 44 to check the status or condition of stage 30, 32, 34 on display 42 as shown in FIG. 7, with controller 14 operating in a check status mode. In the illustrated embodiment where system 10 has one pre-filter stage 30, two RO stages 32, and one DI stage 34, controller 14 has four switches 44. Of course, it is contemplated by the present disclosure for controller 14 to have any desired number of switches 44 that correspond or differ from the number of stages 28. Further, it is contemplated by the present disclosure for controller 14 to have one or more other switches that allow the user to verify the status of any other component controlled by the controller.

Figure 8:
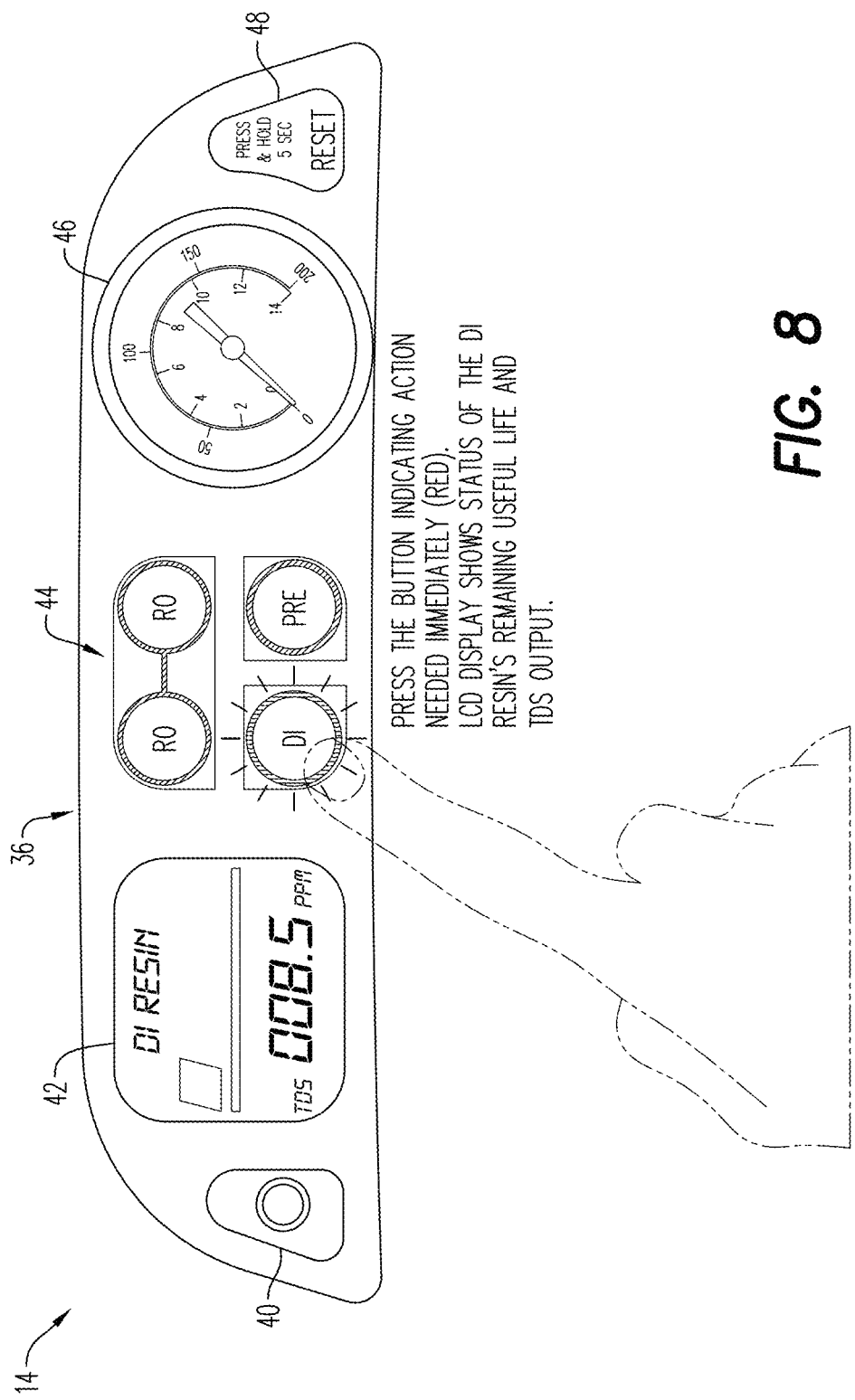
FIG. 8 illustrates the controller of FIG. 4 in a warning status mode.

In addition to or instead of rotating or changing the information displayed on display 42 by way of switches 44, controller 14 can, in some embodiments such as that shown in FIGS. 6a, 6b, and 8, be configured to control the switches so that the switches themselves act as indicators to provide visual feedback to the operator as to the status of the particular stage 28.

For example, switches 44 can include LED indicators that are controlled by controller 14 to illuminate: in a first color (e.g. green—FIGS. 6a-6b) when the particular stage 28 has an acceptable operating status; in a second color (e.g., yellow—FIG. 7) when the particular stage has a less than optimal operating status; and in a third color (e.g., red—FIG. 8) when the particular stage has a failed or replacement operating status. When indicating a warning status or replacement status, controller 14 is operating in a warning mode to warn the operator that the quality of water from system 10 is approaching or has fell below an acceptable water quality. Controller 14 can be configured to communicate the status of system 10 directly to the operator and/or with a remote system or manager via visual, audible, text message, email, and others. Preferably, controller 14 provides an audible communication.

In some embodiments where switches 44 act as indicators, the operator can depress and hold switch 44 for a particular stage 28, or other component of system 10, of interest to check the status or condition of that stage, at which point the switch will illuminate in the first, second, or third color, respectively.

Figure 8A:
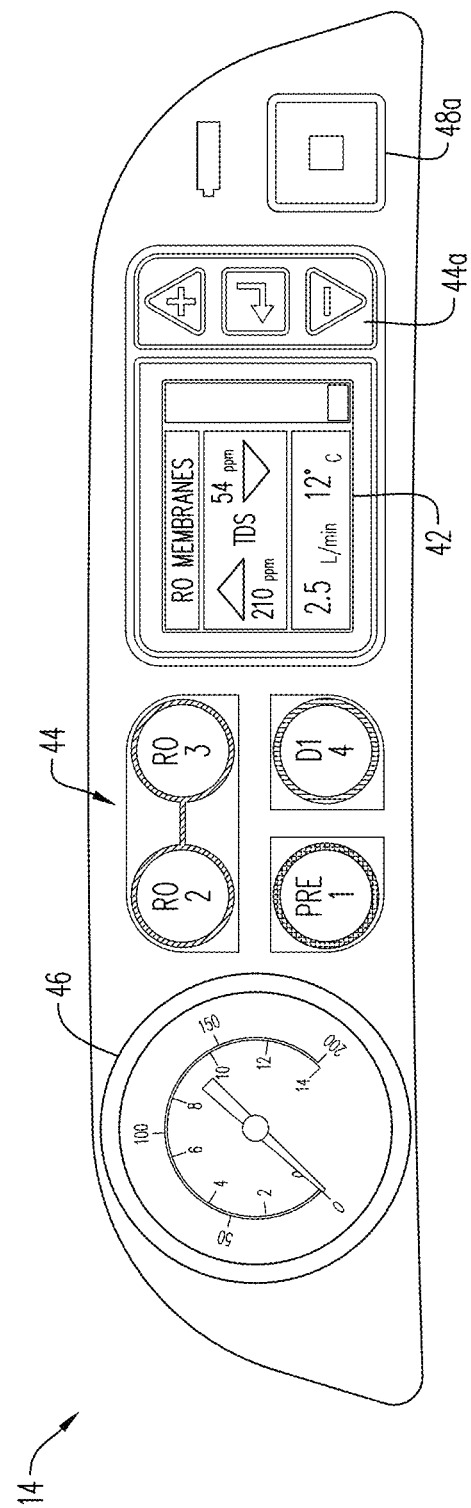
FIG. 8A illustrates an alternate exemplary embodiment of the controller of FIG. 4.

In some embodiments and as shown in FIG. 8a, switches 44 can include switches 44a that allow the operator to toggle through various menus or screens within controller 14 and displayed on display 42. Additionally and instead of reset button 48, controller 14 can include stop button 48a that finds use with embodiments such as that shown in FIG. 10 having diversion control 206, which is described in detail below. In short, stop button 48a can be configured to control controller 14 to stop system 10 by overriding any startup or shutdown programs, if included. Here, controller 14 lacks power button 40—as system 10 is started and stopped in this embodiment via diversion control 206 as described below.

In some embodiments, when switch 44 is depressed, the display 42 shows detailed information about the particular stage 28 that was selected such as but not limited to a measurement of water quality, a life of the stage media, and others.

In some embodiments, controller 14 can allow the operator to select the acceptable water quality for a particular task being performed. By way of example, it is contemplated that an operator arrives at a location for a prearranged task. Controller 14 can be programmed to a desired water quality before arriving at the location, based on an input from the operator at the location, based on a GPS signal received by controller indicating the location of system 10, and others.

For example, when system 10 is used in the cleaning of solar panels, it is contemplated by the present disclosure for controller 14 to control the system to output water with a TDS of less than 50. However, when system 10 is used in the cleaning of windows, it is contemplated by the present disclosure for controller 14 to control the system to output water with a TDS of less than 20.

For example, the work order indicating what work is to be performed at a particular location can include a bar code or other machine readable code. Here, controller 14 can include the necessary hardware and/or software to allow the operator to input the task to be performed based on a scan of the work order. In some embodiments, the scan of the work order can be performed by the user's smart phone—which is in communication with controller 14. Similarly, the GPS signal or other input to controller 14 can be made from an application (i.e., "App") on the user's smart phone. Thus, the "App" makes use of the costly hardware and software already resident on the user's smart phone to input data to controller 14.

As an example, controller 14 could be simplified to have simple output values and then the end user could enter the data into the App on their smart phone and the App could tell them how system 10 is operating, what, if any, issues exist and provide information on what steps can be taken to improve the operation of the system. In another embodiment, controller 14 can transmit information to and from the App via a wired or wireless communication such as, but not limited to, RF, Bluetooth, Wifi, etc. and the smart phone could provide signals and information as needed. Controller 14 can also be controlled remotely via a remote designed for the system or a smart phone via any wired or wireless communication such as, but not limited to, RF, Bluetooth, Wifi, etc.

Pressure gauge 46 can be one or more analog gauge (FIG. 4), one or more digital gauges (not shown), a pressure sensor (FIG. 3), and any combinations thereof. It should be recognized that pressure gauge 46 is shown by way of example only as positioned at incoming flow A. Of course, it is contemplated by the present disclosure for gauge 46 to be in any desired position within system 10.

Additionally, it is contemplated by the present disclosure for conditioner 12 to include one or more pressure relief valves (FIG. 10) that are controlled by pressure gauges 46—or preferably operate without the need for input from the pressure gauges to automatically relieve pressure from any portion of the conditioner. For example, the pressure relieve valves can be a mechanical pressure relief valve, a pressure relief rupture disk, an electronic pressure relief valve, any other relief device, or combinations thereof. Here, gauges 46 and/or the relief valve can, in some embodiments, be in wired and/or wireless communication with controller 14 so that the valve can be activated by controller and gauges as needed.

In some embodiments, controller 14 can be configured to calculate a volume of water processed, in any desired unit of measure (e.g., gallons or liters), using run timer 46-1. For example, controller 14 can use an input of elapsed time from timer 46-1 to determine an estimated volume of water that has been processed. In some embodiments, timer 46-1 can be activated to commence tracking an amount of water processed based on a pressure from pressure sensor 46, which activates and/or wakes the timer for measuring the usable life of pre-filter stage 30.

Controller 14 is configured to indicate the first, second, and third colors of switch 44 for pre-filter stage 30 based on the volume of water processed by pre-filter stage 30 as determined from timer 46-1 and, when utilized, sensor 46. Of course, it is contemplated by the present disclosure for controller 14 to include a flow meter or other sensor or combination of sensors (digital and/or analog) configured to provide a volume of incoming water that has been processed. Also, it is contemplated by the present disclosure for controller 14 to be configured to provide be more or less levels of colors to provide the operator with more or less information as desired for different scenarios/usages.

In some embodiments, controller 14 includes a reset relay 48-1 that automatically shuts down or at least reduces a flow of water through system 10 in the event that a predetermined number of gallons have been processed. After servicing or replacing pre-filter stage 30, the operator can reset relay 48-1 via reset button 48. It is also contemplated by the present disclosure for controller 14 to trip relay 48-1 (or any other trip device) as needed based on the inputs of any of the sensors 50, 50-1, 52, 54 or any other input (e.g., from RFID, App, etc.) in conditioner 12. In other embodiments, controller 14 can reset relay 48-1 by holding down the switch 44 of the particular stage that has been serviced for a predetermined period time.

A more detailed discussion of the operation of processor 38 and sensors 50, 50-1, 52, 54 will be discussed with reference to FIG. 3b. System 10 is advantageously configured to include sensor 50-1 that detects a quality of incoming water. Sensor 50-1 can be before or after pre-filter stage 30, when present.

It has been determined by the present disclosure that the cost of resin in DI stage 34 far outweighs the cost of filter in RO stage(s) 32 per volume of purified water. Advantageously, controller 14 is configured to ensuring that the filters in RO stage(s) 32 are operating properly to avoid, mitigate, or reduce the utilization of resin in DI stage 34.

In the illustrated embodiment, controller 14 uses the input from sensor 50—positioned before RO stage 32 and the input from sensor 52—positioned after the RO stage to determine an efficiency of the RO stage—which is commonly referred to as the "percent rejection". The percent rejection is a determination of the percent of dissolved solids that are rejected by the membrane present in RO stage 32. The dissolved solids that are rejected remain in the concentrate flow (i.e., a flow of concentrated dissolved solids), while any dissolved solids that are not rejected pass through the membrane to the permeate flow.

In one example, controller 14 performs a simple compare of the inputs from sensors 50, 52 to indicate the first, second, and third colors of switches 44 for RO stage 32. In one exemplary embodiment, controller 14 determines the percent rejection between sensors 50 and 52. For example, controller 14 can determine that the TDS of water at sensor 50 (i.e., entering RO stage 32) is 400 parts per million (PPM)—typically via a measurement of the conductivity of the water—and that the TDS at sensor 52 (i.e., exiting the RO stage) is at 20 ppm—again by measuring the conductivity of the water, resulting in a percent rejection of 95%.

Controller 14 can be configured to alert the operator with the first color (e.g., green) when the percent rejection is below a first threshold, with the second color (e.g., yellow) when the percent rejection is below the first threshold but above a second threshold, and with the third color (e.g., red) when the percent rejection is below the second threshold.

Further, controller 14 uses the input from sensor 54, positioned after DI stage 34, to indicate an outgoing water quality. Controller 14 uses the input from sensor 54 to indicate the first, second, and third colors of switch 44 for DI stage 34.

Figure 9:
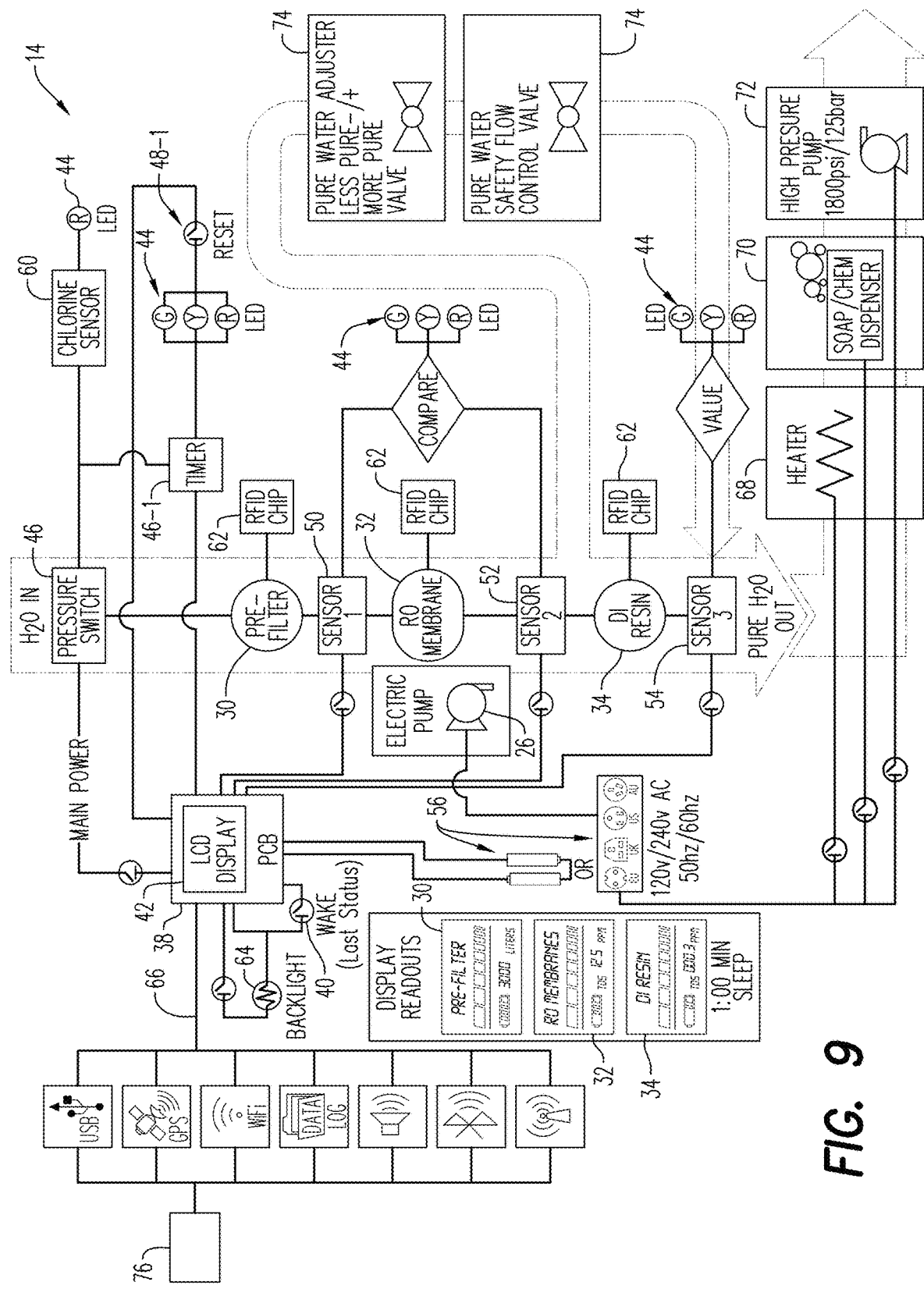
FIG. 9 illustrates additional operational attributes of the controller of FIGS. 3A and 3B.

In the illustrated embodiment, sensors 50, 52, 54 are sensors that detect total dissolved solids (TDS). Here, controller 14 calculates a differential between TDS in and TDS out of the filters at RO stage 32, and if desired, DI stage 34 and can display this information to the user via display 42. In some embodiments as shown in FIG. 9, display 42 can be large enough to show the information for all sensors 50, 50-1, 52, 54 all the time. In other embodiments as shown in FIG. 6a, display 42 can be smaller so as to display information from only one sensor 50, 50-1, 52, 54 at time. Here, switches 44 can be configured to change display 42 to cycle between the different sensors 50, 50-1, 52, 54 to provide the information depending on which button was depressed.

In some embodiments, controller 14 can include one or more sensors configured to detect any property or quality of the water such as, but not limited to, flow rate, time interval, pressure, chlorine level, salt level, mineral levels, metal levels (e.g., iron), temperature, viscosity, resistivity, pH level, conductivity, and others.

Controller 14 can be configured to optimize the life of the membranes in RO stage 32 by flushing the membranes as needed. Without wishing to be bound by any particular theory, it is believed that flushing concentrate from the membranes of RO stage 32—based on inputs from one or more of sensors 50, 50-1, 52, and 54—can extend the life of the membranes or, at least maintain the RO stages in an optimal working condition. Thus, controller 14 can be configured to automatically flush one or both RO stages 32 at any predetermined time or before/after any desired action. For example, controller 14 can automatically flush RO stages 32 at startup, shutdown, at some pre-determined number of gallons processed, after some length of run time, at a recirculation pump backpressure, a reduction in flow or efficiency, an increased backpressure through the membranes, and others.

Additional features and functionality of controller 14 will be appreciated with reference to FIG. 9.

For example, it has been determined by the present disclosure that chlorine is particularly aggressive in fouling RO stage 32. Additionally, it has been determined by the present disclosure that the presence of chlorine after pre-filter stage 30 can be used as an indicator that the pre-filter stage is no longer effectively removing the desired chlorine levels.

As discussed above, controller 14 can estimate the useable life of pre-filter stage 30 based on volume of water processed as detected by timer 46-1 or based on a direct measurement of volumes via flow sensors (e.g., sensors 184, 204 in FIG. 10).

Additionally either alone or in combination with timer 46-1, controller 14 can, in some embodiments, include a chlorine sensor 60 (FIG. 9) and an associated switch/indicator 44. Sensor 60 and associated switch/indicator 44 can indicate in the first, second, third colors based on the level of chlorine that has passed through pre-filter 30. In one embodiment, controller 14 can estimate a level of chlorine that has passed through pre-filter 30 based on a chlorine level of the water as indicated by sensor 60 and a volume of the water that passed through the pre-filter.

Of course, it is contemplated by the present disclosure for system 10 to determine a health of pre-filter 30 by any desired method such as, but not limited to, a number of hours of use, a pressure change across the pre-filter, or any other attribute indicative of the health of the pre-filter. In the embodiment illustrated, the associated switch/indicator 44 only indicates when the chlorine level exceeds a predetermined threshold.

One or more portions of stages 30, 32, 34 can include RFID chips 62, respectively, which can be detected by controller 14 to ensure proper placement by the operator of the correct consumable filter components into conditioner 12.

Display 42 can include a backlight 64 to provide better illumination to the display.

Controller 14 can include any desired number or type of communication devices and/or ports to allow input and/or output signals 66 of information to and from processor 38 including, but not limited to, HDMI, USB, GPS, WiFi, data logs, sound, Bluetooth, RF, and others. Example these capabilities allow the end user to adjust the system without having to walk back to the unit as well as provide information to the main office to order supplies or spare parts, track usage of resin, cost and profits of the job, location of the job, etc. as well as to the manufacturer regarding the performance of the system to make improvements to the design or manufacturing including performance, features for different applications, end user needs, etc.

Controller 14 can further control one or more of a heat exchanger 68, a chemical dispenser 70, a secondary or high pressure motorized pump 72, and one or more valves 74.

Controller 14 can control heat exchanger 68 to heat and/or cool water going into and/or out of conditioner 12 as desired.

Controller 14 can control dispenser 70 to dispense a chemical such as, but not limited to, soaps, cleaning chemicals, rinsants, waxes, colorants, additives including but not limited nanotechnology additives to modify the surface being cleaned, odorants, and others.

Controller 14 can control pump 72 to increase or decrease the pressure of water exiting conditioner 12 to a desired pressure—either alone or in combination with pump 26 (before and/or after RO stages 32) when present.

Conditioner 12 can include valves 74 controlled by controller 14, to allow the controller to bypass or divert water, or a portion of water, in system 10 around one or more of stages 28 and/or shut off or adjust the operation of pump 26. In the illustrated embodiment of FIG. 9, conditioner 12 includes two valves 74 configured to allow controller 14 to divert water exiting RO stages 32 from passing through DI stage 34 and into sensor 54. In this manner, controller 14 can adjust the purity of water exiting conditioner 12 to a desired level.

In other embodiments, valves 74 can be positioned before and/or after any of stages 28. For example, controller 14 can control valves 74 to divert incoming water past all of stages 28 during a first or initial conditioning step, then control the valves to pass the water through pre-filter stage 30 and RO stages 32 until such time as the pre-filter and RO stages are no longer capable of providing water of the desired quality, at which time the controller can control the valves to pass the water through DI stage 34.

Simply stated, controller 14 is configured to control valves 74 to provide water of a desired quality depending on the cleaning task to be performed. Moreover, controller 14 is configured to adjust, based on—for example—the inputs from sensors 50, 52, 54, the amount of water flowing through stages 28 to maintain the desired quality while maximizing the utilization of the consumable filter media within the stages.

For example, the end user could set the outgoing flow G1, G2, G3 to a particular TDS level and system 10 can control the flow of water through conditioner 12 to bypass one or more stages 28, such as DI stage 34 to avoid wasting resin. If the end user is cleaning solar panels and wants a level of 50 TDS maximum and after the incoming water goes through pre-filter stage 30 and RO stages 32 the water is at this desired level, then controller 14 can divert the water around DI stage 34.

Controller 14 can also control valves 74 as automatic shut-off valves in the event that flow of water through one or more portions of conditioner 12 is restricted or the supply of water into the conditioner drops below a predetermined level or pressure drops within the conditioner for any reason.

In other embodiments, controller 14 can control valves 74 to adjust a ratio of concentrate and permeate flow through RO stage 32, which can extend the useable life through the membrane in the RO stage based on the desired water quality.

It should be recognized that valves 74 have been illustrated as being controlled by controller 14 by way of example only. Of course, it is contemplated by the present disclosure for valves 74 to be manually operated. Such manually operated valves can be positioned on system 10, on the incoming water supply, on the outgoing water supply, and any combinations thereof.

In some embodiments, manually operated valves can be in wired and/or wireless communication with controller 14—such that the controller can adjust the operation of one or more aspects of system 10 based on a position or state of the valve—such as described in more detail with respect to diversion control 206 in FIG. 10.

In one example shown in FIG. 1B, pole 20 can include valve 74-1, not controlled by controller 14, where the valve can restrict flow from system 10 through tube 18. In some embodiments, valve 74-1 can be in wired and/or wireless communication with controller 14—such that the controller can adjust the operation of one or more aspects of system 10 based on a position or state of valve 74-1.

In still other embodiments, controller 14 can be configured to control the flow of water through stages 28 based on, at least in part, a cost benefit analysis comparing the cost of DI resin in DI stage 34 to the cost of the membranes in RO stage 32 to achieve water of the desired quality at sensor 54 based on the incoming water quality at sensor 50.

It has been determined by the present disclosure that collection of data from controller 14 is particularly useful to ensure conditioned water quality at the lowest cost. For example based on the GPS location of controller 14, the operator can access a database (not shown) of incoming water quality via the controller or a master system 76 in communication with the controller.

Here, it can be determined—for example that system 10 can be preferably set up to operate with two pre-filter stages 30, one RO stage 32, and one DI stage 34 based on the known incoming water quality and the desired outgoing water quality. Advantageously, system 10 can, in some embodiments, be configured so that each stage 28 can be removably connected to frame 24 to accommodate the desired stages. In some embodiments, controller 14, frame 24, and stages 28 can be configured to automatically detect the configuration of system 10 (i.e., the number and position of stages 30, 32, 34 within the system).

In some embodiments, system 10 is configured to operate even in the event of failure of controller 14. Here, system 10 can include an override or manual operation control, which allows the operator to bypass or deactivate controller 14 and its various sensors and programs, yet still provide operating power to pump 26. Further, system 10 is also configured so that the operator can, when in the bypassed mode, manually operate the various valves in the system to provide pure water.

Referring now to FIG. 10, a process and instrument diagram (PNID) of an exemplary embodiment of another water conditioning system 110 according to the present disclosure is shown with component parts performing similar or analogous functions to those of system 110 labeled in multiples of one hundred.

Water is input into system 110 at inlet 180. In some embodiments, system 110 includes a sensor 182 that measures a total dissolved solids (TDS) and temperature of the incoming water at or proximate inlet 180. First sensor 182 is in wired and/or wireless communication with controller 138 so that the controller has access to the measurements detected by the first sensor.

The incoming water is then conditioned by a pre-filter 130 to at least partially condition the water. System 110 includes a flow sensor 184 to determine a state of the water exiting pre-filter 130 such as, but not limited to a flow rate prior to pump 126 the incoming flow rate and minimum flow prior to turning on the pump. Flow sensor 184 is in wired and/or wireless communication with controller 138 so that the controller has access to the measurements detected by the second sensor. For example, controller 138 can use the measurement of flow detected by sensor 184 to notify a user when to change pre-filter 130.

System 110 can further include a pressure relief valve 186 that relieves pressure in the event a desired maximum pressure is exceed. Valve 186 can be a mechanical pressure relief valve, a pressure relief rupture disk, an electronic pressure relief valve, any other relief device, or combinations thereof. Valve 186 can, in some embodiments, be in wired and/or wireless communication with controller 138 so that the valve can be activated by controller as needed.

Pump 126 is in wired and/or wireless communication with controller 138 so that the controller controls one or more parameters of the pump. For example, controller 138 can control a speed of pump 126, a pressure induced by the pump, a flow rate induced by the pump, turn the pump on or off, and any other desired control functions.

System 110 can, in some embodiments, include a TDS and temperature sensor 150 to determine the quality of the water entering RO filters 132, preferably in the recirculation loop. Third sensor 150 is in wired and/or wireless communication with controller 138 so that the controller has access to the measurements detected by the third sensor.

Water passing through RO filters 132 is conditioned by the RO filters, which separates the water into a waste or concentrate stream 188 and a conditioned or permeate stream 190.

Beginning with the flow of permeate stream 190, system 110 can include a TDS sensor 152 to determine a final state of the permeate stream. Sensor 152 can include a temperature and/or flow sensor. Sensor 152 is in wired and/or wireless communication with controller 138 so that the controller has access to the measurements detected by the sensor. It should be understood that sensor 152 can be multiple sensors configured to detect the desired attributes.

System 110 further includes a bypass valve 192 that is in wired and/or wireless communication with controller 138 so that the controller can operate the valve between a first position 194 that places the permeate stream in fluid communication with DI filter 134 or a second position 196 that places the permeate stream in fluid communication with a waste water outlet 198.

In some embodiments, valve 192 can further be controlled by controller 138 to operate to a third position 200 that places the permeate stream in fluid communication with pure water outlet 202—such as may occur when the performance of RO filters 132 provide the permeate stream with sufficient water quality as determined by sensor 152.

In instances where valve 192 is controlled to place the permeate stream in fluid communication with DI filter 134, the permeate stream is further conditioned by the DI filter.

System 110 includes a TDS sensor 154 to determine a state of the conditioned stream after DI filter 134 and before the conditioned water exits the system at outlet 202. Sensor 154 is in wired and/or wireless communication with controller 138 so that the controller has access to the measurements detected by the sensor.

Returning now to the flow of concentrate stream 188, system 110 includes a flow sensor 204 to determine (e.g., measure) the flow of the concentrate stream. Sensor 204 is in wired and/or wireless communication with controller 138 so that the controller has access to the measurements detected by the sensor. Of course, it is contemplated by the present disclosure for sensor 204 to determine the flow of the permeate stream.

System 110 further includes diversion control 206. Diversion control 206, preferably, includes a valve 208, a start position sensor or switch 210, and a stop position sensor or switch 212. Sensors 210, 212 are in wired and/or wireless communication with controller 138. Valve 208 and/or sensor 210 are positioned and configured to allow the sensor 210 to detect when the valve 208 is in a "start position" such as when the valve is in contact or otherwise sensed by sensor 210. Similarly, valve 208 and/or sensor 212 are positioned and configured to allow the sensor 212 to detect when the valve 208 is in a "stop position" such as when the valve is in contact or otherwise sensed by sensor 212.

Valve 208, when in the start position, is closed or mostly closed to minimize the flow through concentrate stream 188 and maximize the flow through permeate stream 190. Conversely, valve 208, when in stop position, is open or mostly opened to maximize the flow through concentrate stream 188 and minimize the flow through permeate stream 190.

System 110 is configured to operate in a startup mode when diversion control 206 is moved to the start position, with controller 138 detecting from sensor 210 that valve 208 is in the start position. During startup mode, valve 192 is moved to second position 196 and pump 126 is turned on—if there is enough flow of water detected by sensor 184—by controller 138 so that any high TDS water that has collected on the permeate side of the membrane in RO filter 132 is discharged through outlet 198. In this manner, system 110 provides the startup mode, which is believed to transfer water having high TDS from RO filters 132 to outlet 198 and, thus, preventing high TDS water at startup from prematurely depleting the resin in DI filter 134.

For example, system 110 can be configured to, upon controller 138 detecting from sensor 210 that knob 208 is in the start position, control the controller to turn on pump 126 and move valve 192 to second position 196, sending permeate stream 190 to waste for a predetermined period of time. System 110 operates in the startup mode for a predetermined period of time that is, preferably, a period of time sufficient to transfer the high TDS water that is within RO filters 132 to waste outlet 198. The predetermined period of time may be a set period or may be determined by controller based on inputs from one or more of sensors 182, 184, 150, 152, 154, and 204.

After the predetermined period of time, controller 138 controls valve 192 to move the valve to first position 194 so that that the permeate stream 190 is fluidly communicated to DI filter 134, providing conditioned water from the DI filter to water outlet 202.

In embodiments where valve 192 includes third position 200, controller 138 can be further configured to control valve 192—after completion of the predetermined period of time or may be determined by controller based on inputs from one or more of sensors 182, 184, 150, 152, 154, and 204—to move to the valve to third position 200 so that permeate stream 190 is in fluid communication with pure water outlet 202 without passing through DI filter 134—as may occur when the performance of RO filters 132 provide the permeate stream with sufficient water quality as determined by sensor 152, providing conditioned water from the RO filters to water outlet 202.

It should be recognized that, in this embodiment, valve 192 is disclosed by way of example as having three positions. Of course, it is contemplated by the present disclosure for valve 192 to be a combination of different multiple 2-way valves to accomplish the same function.

Valve 208 can be adjusted by the user and/or by controller 138, dependent on a rotational position of the valve between the start and stop positions, to adjust the flow through concentrate stream 188 and permeate stream 190 as desired.

In some embodiments, system 110 can include a timer in controller 138 that only activates the aforementioned startup mode when the controller detects that the system has been off for more than a predetermined period of time. Here, the predetermined period of time within which contaminates within RO filter 132 pass from the concentrate side of the membrane to the permeate side. In some embodiments, system 110 is configured to use signals from sensor 152 or one or more other sensors to determine whether to begin the startup mode.

In other embodiments, it is contemplated by the present disclosure for controller 138 to move valve 192 to second position 196 during start up when sensor 152 detect TDS level above a predetermined level and keep valve 192 in the second position until the TDS levels at sensor 152 drops below an acceptable predetermined level, at which time controller 138 can move valve 192 to first position 194 to place permeate stream 190 in fluid communication with DI filter 134 or can move valve 192 to third position 200 to place permeate stream 190 in fluid communication with outlet 202.

Once the startup mode is completed, system 110 can be considered to be operating in a normal or operational mode.

System 110 is also configured—via controller 138—to operate in a shutdown mode when diversion control 206 is moved to the stop position as detected by sensor 212. As discussed above, diversion control 206—when valve 208 is in the stop position maximize flow of concentrate stream 188 and minimizes flow through permeate stream 190 by reducing the back pressure on the concentrate line—which flushes an increased flow across the membrane to clean the membrane.

During the shutdown mode, system 110 is configured to flush water, preferably at about 3 gallons per minute, through each RO filter 132 to outlet 198, which is believed to remove scale and particulate matter from the RO filters, thus extending the life of the membranes in the RO filters.

For example, system 110 can be configured to, upon controller 138 detecting from sensor 212 that valve 208 is in the stop position, control the controller to ensure pump 126 is on—if there is enough flow of water detected by sensor 184—and move valve 192 to second position 196, sending permeate stream 190 to waste for a predetermined period of time. The predetermined period of time is, preferably, a period of time sufficient to flush a desired amount of scale or debris that is within RO filters 132 to waste outlet 198. The predetermined period of time may be a set period or may be determined by controller based on inputs from one or more of sensors 182, 184, 150, 152, 154, and 204. After the predetermined period of time, controller 138 turns pump 126 off.

In other embodiments, system 110 can include a timer in controller 138 that only activates the aforementioned shutdown mode when the controller detects that the system has been on for more than a predetermined period of time. Here, the predetermined period of time within which contaminates build within RO filter 132 beyond a threshold. In some embodiments, system 110 is configured to use signals from sensor 152 or one or more other sensors to determine whether to begin flush the system via shutdown mode.

It is contemplated by the present disclosure for diversion controller 206 to further include a concentrate flow control valve 214, which preferably is set to a predetermined level. Of course, it is contemplated by the present disclosure for valve 214 to be user adjustable and/or adjustable via controller 138. Valve 214, when present, ensures a minimum flow through RO filters 132 when valve 208 is closed (i.e., in the start-up position) to reduce scaling and fouling. Valve 214 is preferably set to allow flow of concentrate stream 188 regardless of the position of valve 208, which is believed to provide a constant back pressure on RO filters 132—which allows controller 138 to perform an RO performance calculation under constant conditions.

In some embodiments, system 110 can include a back pressure regulator 216 that fluidly communicates concentrate stream 188 to pump inlet 218. When the pressure within concentrate stream 188 exceeds a predetermined back pressure, back pressure regulator 216 opens to divert a portion of the concentrate stream flow back to inlet 218 so that as pressure increases in the concentrate stream, the flow through the regulator increases. Additionally, regulator 216 can be adjustable, manually or via controller 138 or both, to adjust the pressure on RO filters 132.

Preferably, back pressure regulator 216 can be an adjustable mechanical regulator. Of course, it is contemplated by the present disclosure for regulator 216 to be an electronic regulator that is in wired or wireless communication with controller 138 so that the controller can control the regulator based on inputs from one or more of sensors 182, 184, 150, 152, and 204.

Accordingly, system 110 is advantageously controlled and monitored by controller 138 and operated by the user via diversion controller 206 to selectively pass incoming water through filters 130, 132, 134 to provide conditioned water of desired quality, as well as to control the ratio of concentrate and permeate streams 188, 190.

It should be recognized that system 110 is described herein by way of example only. Of course, it is contemplated by the present disclosure for system 110 to include any number of different conditioners that are fluidly connectable to one another in series, in parallel, and any combinations thereof. Further, it is contemplated for controller 206 to detect one or more operational attributes of the pump 126 such as, but not limited to, current, voltage, temperature, speed, pressure, and others—and adjust the operation of system 110 based on these attributes.

Accordingly, system 110 is advantageously controlled and monitored by controller 138 and operated by the user via diversion controller 214 to selectively pass incoming water through filters 130, 132, 134 to provide conditioned water of desired quality. System 110 has both RO filters 132 and DI filter 134 combined into a single easy to use system that advantageously include diversion controls that, in some embodiments, reduce the utilization of DI resin and extend the life of the RO filters by flushing the membranes after use. In addition, system 110 advantageously has diversion controls that allow the operator to easily balance/control the ratio of permeate and concentrate streams 188, 190. Moreover, system 110 is configured monitor the performance of the pre-filter 130 and/or RO filters 132, which can extend the life of the filters and further reduce costs.

Controller 138 is configured to determine the volume of concentrate stream 188 and/or permeate stream 190 from the flow volumes detected by flow sensors 184, 204 or to detect the volume of the streams from other flow sensors (not shown). It has been determined by the present disclosure that determining and controlling, both manually by the user and automatically via controller 138, the ratio of concentrate and permeate streams 188, 190 can be useful to monitor the health state (i.e., the percent rejection) of the RO filters 132—allowing more precise determinations of when to replace the RO filters than was previously possible. By precisely determining the replacement of the RO filters 132 can optimize the utilization of DI filter 134.

Controller 138 can be configured to verify an effectiveness or performance of pre-filter 130 via sensor 150 and/or a comparison of outputs from one or more of sensors 182, 184, 150. Controller 138 is also configured, in some embodiments, to determine a flow volume processed by pre-filter 130 since replacement via sensor 184 so that the controller 138 can determine a remaining useful life of the pre-filter. In this manner, system 110 is configured to extend the life of the more expensive RO filters 132 by ensuring that water entering the RO filters meets a desired quality.

It has been determined by the present disclosure that of particular concern when considering the performance of RO filter 132 is the chlorine level of water entering the RO filter. Accordingly, and in some embodiments, sensor 150 and/or sensor 184 can be configured to detect chlorine in the water before entering RO filter 132 and after pre-filter 130. Pre-filter 130 can be an activated carbon filter and/or particle filter to remove chlorine, debris, and other harmful components in the incoming water to protect not only the RO and DI filters 132, 134, but also the sensors, pump, and other components of system 10.

Thus and in order to prevent undue damage to or utilization of RO filters 132, controller 138 can be, in some embodiments, selectively configured so that in the event that the water after treatment by pre-filter 130 does not meet the desired quality, controller 138 can do one or more of notify the user (e.g. audible alarm, visual alarm, text alarm, email, etc.), turn pump 126 off, and move valve 192 to second position 196 to place permeate stream 190 in fluid communication with waste water outlet 198, and others.

In order to prevent undue damage to or utilization of RO filters 132, controller 138 can be, in some embodiments, selectively configured to have a predetermined acceptable TDS of water entering the RO filters as detected at sensor 150. In the event that the TDS of the water at sensor 150 exceeds the predetermined level, controller 138 can do one or more of notify the user (e.g. audible alarm, visual alarm, text alarm, email, etc.), turn pump 126 off, and move valve 192 to second position 196 to place permeate stream 190 in fluid communication with waste water outlet 198, and others.

It has been determined by the present disclosure that the health or performance of RO filters 132 can, in some embodiments, be determined by controller 138 comparing the TDS detected by sensor 152 to a known or desired value.

It has been determined by the present disclosure that the health or performance of RO filters 132 can, in some embodiments, be determined by controller 138 comparing the TDS before and after the RO filters as detected by sensors 150, 152 and determining a percent rejection due to the RO filter.

Without wishing to be bound by any particular theory, the percent rejection due to RO filters 132 is believed to be effected by variable such as, but not limited to water temperature, back pressure on the filters, and other variables. Advantageously, system 110 is configured to provide accurate reading of the percent of TDS reduction across RO filters 132 by compensating for these variables in controller 138.

Figure 11:
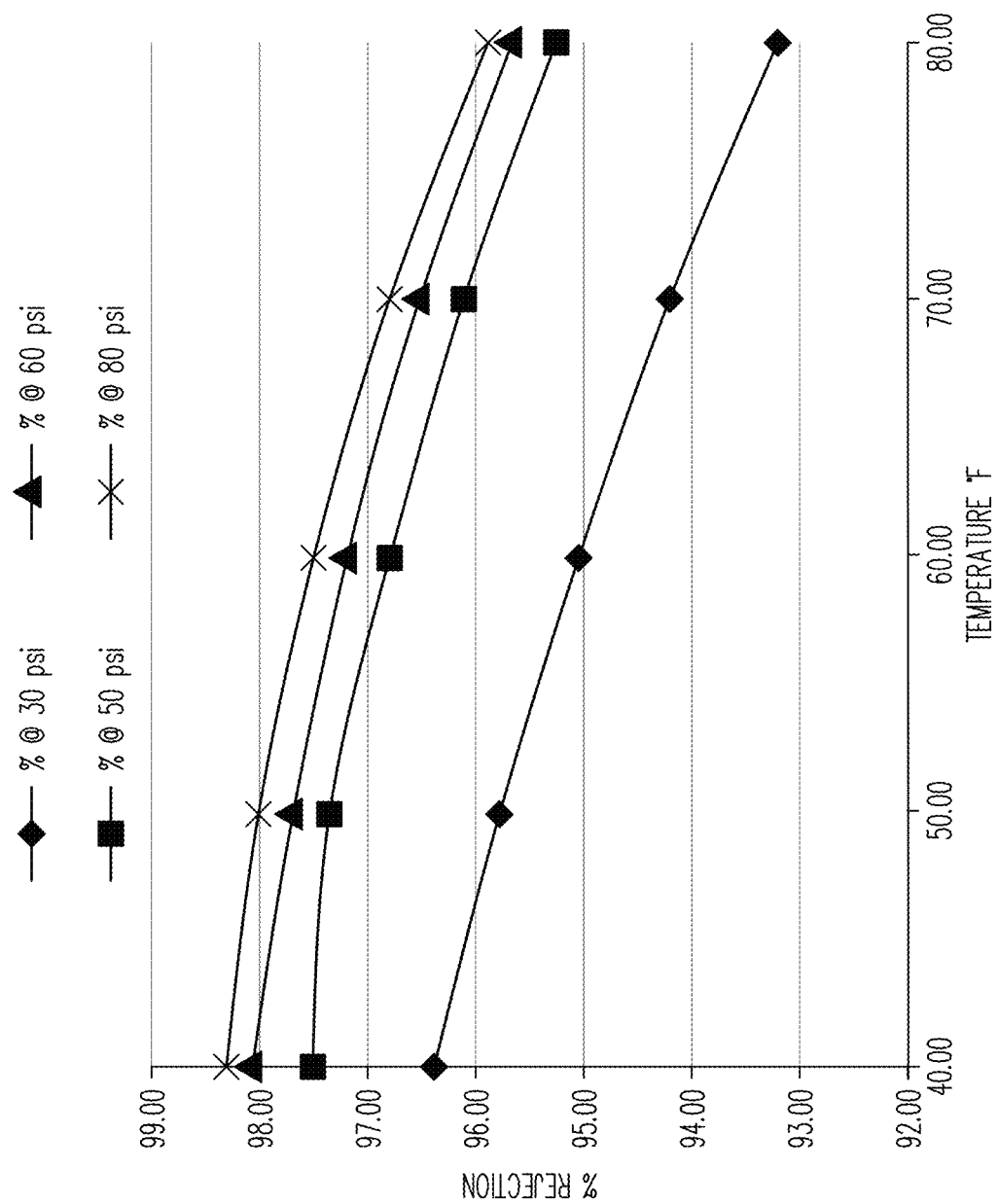
FIG. 11 illustrates an effect on a percent rejection across RO filters based on temperature at four different pressures.

For example, system 110 is configured so that any one or more of sensors 182, 150, 152 detect the water temperature. FIG. 11 illustrates an effect on the percent rejection across RO filters 132 based on temperature. This effect is illustrated at four different pressures within system 110.

Controller 138 is configured to adapt the calculated percent rejection across RO filters 132 based, at least in part, on the temperature. Additionally, system 110 is configured to maintain the backpressure on RO filters 132 to a predetermined range via regulator 216 and flow control 214—such that controller 138 can select the best fit of the temperature curves based on the pressure set at the regulator or use a calculation to estimate the impact of the temperature and adjust the calculated percent rejection.

In other embodiments, controller 138 can measure the pressure within system 110 and can adapt the calculated percent rejection across RO filters 132 based, at least in part, on the temperature and the measured pressure.

System 110 can include a heat exchanger (not shown) controlled by controller 138 to increase and/or decrease the temperature of the water in the system, which can improve both the performance of RO filters 132 and the measurement of this performance.

Simply stated, system 110 is configured to measure and/or control one or more of the variables (e.g., pressure, temperature, etc.) that effect the percent rejection across the RO filters 132. Without wishing to be bound by any particular theory, system 110 is in this manner adapted to improve performance of the RO filters and improve, by adapting based on the measured/controlled variables, the measurement of the percent rejection of RO filters 132.

It should be recognized that the various methods of determining the health or performance or efficiency of RO filters 132 is described above by way of example as being performed on all of the RO filters simultaneously. Of course, it is contemplated by the present disclosure for system 110 to include sufficient sensors in communication with controller 138 for the controller to differentiate between the health of the individual RO filters 132.

Measurement of the percent rejection across RO filters 132 has been determined by the present disclosure to be an important aspect of determining when to replace the RO filters. An example of this can be seen with reference to FIG. 12. In this embodiment, DI filter 134 is a filter cartridge with a cost of $30 per cartridge. The percent rejection across RO filter 132 is illustrated from left to right and the number of DI cartridges/cost of those cartridges necessary in order to provide a known volume of pure water (assumed to be about 18,500 gallons) is shown from top to bottom at three different incoming water quality levels (i.e., 200 ppm, 400 ppm, and 800 ppm). Here, it can be seen that the number and cost of the DI cartridges increase as the percent rejection across RO filters 132 decreases (from left to right) and as the level of dissolved solids in the incoming water increases (from top to bottom).

Advantageously, system 110 can be configured to track—for example, an average incoming water quality that system 110 is exposed to, maintain that average in memory, and advise the user—based on that assumed incoming water quality and the calculated health (i.e., percent rejection) of RO filter 132 when it is most cost effective for the user to replace the RO filter 132. Of course, it is contemplated by the present disclosure that an end user can have a plurality of different systems 110, allowing them to select the most efficient of their systems depending on the particular task at hand—such as selecting a system that has filters 130, 132, 134 of a particular health or efficiency for task that require low TDS (e.g. windows), but select a system of a lower health for tasks that allow for higher TDS (e.g., solar arrays).

Further, it is contemplated by the present disclosure for system 110 to use GPS data as to the location of the system to determine an assumed incoming water quality in the aforementioned determination alone or in combination with current and/or historical measurements of the incoming water quality. Here, the GPS data can indicate a known incoming water quality previously measured by system 110 at that location or measured by other systems 110 with which the particular system is in communication with.

In this manner, system 110 is a referred to as a smart system, namely one that learns or determines variables that effect the cost of use of filters 132, 134 and provides information to the user—based on those variables—as to how to optimize the use of the system.

When controller 138 detects at sensor 152 that the quality of permeate stream 190 is below a desired level for input into DI filter 134 and in order to prevent undue depletion of resin in the DI filter, the controller can control system 110 to bypass around the DI filter so that the life of the resin is not reduced. For example, system 110 can bypass around DI filter 134 by controller 138 moving valve 192 to second position 196 to place permeate stream 190 in fluid communication with waste water outlet 198. Alternately, system 110 can bypass around DI filter 135 by controlling valve 192 to move to the third position, placing RO filter 130 in fluid communication with outlet 202. Furthermore, system 110 can, via controller 138, can notify the user (e.g. audible alarm, visual alarm, text alarm, email, etc.) of the status and/or turn pump 126 off.

Accordingly, system 110 is configured to ensure that pre-filter 130 and RO filters 132 are replaced at the appropriate time—namely not before the performance of the pre-filter and RO filters are acceptable and not after the performance drops to a level that utilizes resin in DI filter 134 too rapidly. In this manner, system 110 is configured to extend the life of the more expensive DI filter 134 by ensuring that water entering the DI filter meets a minimum TDS quality.

Further, system 110 is configured to ensure that the resin in DI filter 134 is replaced only after it has been fully or substantially fully utilized but before the TDS of water at outlet 202 remains acceptable for the cleaning activity being performed.

In some embodiments, system 110 can separately communicate the health or performance of pre-filter 130, RO filters 132, and DI filter 134 to the user via display 42. The communication can be in the form of simple, easy to understand status states (e.g., green, yellow, red) or in the form of more complex numerical indicators that provide, for example, the actual TDS levels, a percent rejection across each of the filters, a membrane efficiency, gallons of purification remaining, and others.

Referring now to FIGS. 13 and 14 various status communications output by system 110 on display 42 of FIG. 8a regarding the health or operational status of the system and one or more of filters 130, 132, 134. Here, system 110 can be configured to display to the user one or more of total volume of pure water produced, average incoming TDS, number of auto flushes completed, number of pre-filters changed, number of resin changes, number of changes of the membranes in the RO filter, software revision, total volume of water into system, average incoming water, total running time of pump, number of times system initiated, number of by-passes, daily/weekly TDS, average permeate flow, average % membrane rejection rate, instructions, warnings, status of the system, and others and any combinations thereof.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of any claims hereafter presented.

What is claimed is:

1. A method for conditioning water, the method comprising:
   flowing water through a water conditioner of a portable water conditioning system, wherein a direction of flow is through the water conditioner, a reverse osmosis stage, and a deionizing stage;
   detecting a first condition of the water before the reverse osmosis stage of the portable water conditioning system;
   detecting a second condition of the water after the reverse osmosis stage, the first condition and the second condition each comprising a level of total dissolved solids in the water;
   determining a percent rejection of the reverse osmosis stage based on the first and second conditions when a pressure on the reverse osmosis stage is at a known state; and
   diverting a portion of the water exiting the reverse osmosis stage out of the portable water conditioning system and maintaining the pressure at the known state.

2. The method of claim 1, further comprising providing conditioned water having a desired condition from the portable water conditioning system.

3. The method of claim 2, wherein the desired condition is based on a location of the portable water conditioning system.

4. The method of claim 1, further comprising outputting conditioned water from the portable water conditioning system.

5. The method of claim 4, further comprising generating a warning status notification when the conditioned water from the portable water conditioning system is below a predetermined water quality.

6. The method of claim 5, further comprising communicating the warning status notification directly to a remote system, wherein the warning status notification is at least one of an audible notification, a visual notification, a text message, and an email communication.

7. The method of claim 1, further comprising adjusting a flow path of the water through the reverse osmosis stage based on the first and second conditions.

8. The method of claim 1, wherein the detecting of the first condition employs a first sensor and the detecting of the second condition employs a second sensor.

9. The method of claim 1, further comprising determining the percent rejection of the reverse osmosis stage based on a plurality of variables effecting an accuracy of determination of the percent rejection.

10. The method of claim 1, wherein the maintaining of the pressure at the known state employs a diversion device.

11. The method of claim 1, further comprising detecting a third condition of the water after the deionizing stage.

12. The method of claim 11, further comprising adjusting the flow path of the water through at least one of the reverse osmosis stage and the deionizing stage based on the first condition, the second condition, and the third condition.

13. The method of claim 11, further comprising determining a health status of the deionization stage based the second condition and the third condition.

14. The method of claim 1, further comprising boosting the pressure of the water flowing through the water conditioner.

15. The method of claim 1, further comprising recirculating the portion of the water exiting the reverse osmosis stage.

16. The method of claim 1, further comprising generating a notification regarding a status of one or more portions of the water conditioner.

17. The method of claim 1, further comprising determining and storing in memory an assumed incoming water quality.

18. The method of claim 17, wherein the determining of the assumed incoming water quality is based on at least one of an average of a plurality of prior total dissolved solids measurements and a known water quality.

19. The method of claim 17, further comprising determining whether or not to change a membrane of the reverse osmosis stage based on the assumed incoming water quality and the percent rejection of the reverse osmosis stage.

20. The method of claim 1, further comprising pre-filtering incoming water before the reverse osmosis stage.

* * * * *